US011067998B2

(12) United States Patent
Lee et al.

(10) Patent No.: US 11,067,998 B2
(45) Date of Patent: Jul. 20, 2021

(54) CLEANING ROBOT AND CONTROL METHOD THEREFOR

(71) Applicant: Samsung Electronics Co., Ltd., Suwon-si (KR)

(72) Inventors: Dong Hun Lee, Ansan-si (KR); Young Do Kwon, Yongin-si (KR); Heum Yong Park, Suwon-si (KR); Min Jae Kim, Seongnam-si (KR); Min Woo Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 16/098,594

(22) PCT Filed: Apr. 26, 2017

(86) PCT No.: PCT/KR2017/004443
§ 371 (c)(1),
(2) Date: Nov. 2, 2018

(87) PCT Pub. No.: WO2017/191928
PCT Pub. Date: Nov. 9, 2017

(65) Prior Publication Data
US 2019/0146504 A1 May 16, 2019

(30) Foreign Application Priority Data

May 2, 2016 (KR) .................. 10-2016-0053827

(51) Int. Cl.
*B25J 19/02* (2006.01)
*G05D 1/02* (2020.01)
(Continued)

(52) U.S. Cl.
CPC .............. *G05D 1/024* (2013.01); *A47L 9/009* (2013.01); *A47L 9/2805* (2013.01);
(Continued)

(58) Field of Classification Search
CPC ... A61B 34/74; A61B 34/37; A61B 2090/371; A61B 34/35; A61B 17/29; A61B 34/30;
(Continued)

(56) References Cited

U.S. PATENT DOCUMENTS

| 4,797,557 A | * | 1/1989 | Ohman | ................... G01S 3/784 250/559.33 |
| 6,459,955 B1 | * | 10/2002 | Bartsch | ..................... A47L 9/00 700/245 |

(Continued)

FOREIGN PATENT DOCUMENTS

EP 2 781 981 A2 9/2014
KR 10-2002-0080897 A 10/2002
(Continued)

OTHER PUBLICATIONS

Plaza et al., An obstacle detector system based on laser technology, 2001, IEEE, p. 9-15 (Year: 2001).*
(Continued)

*Primary Examiner* — McDieunel Marc
(74) *Attorney, Agent, or Firm* — Jefferson IP Law, LLP

(57) ABSTRACT

Provided are a cleaning robot and a method of controlling the same, and more specifically, a cleaning robot provided to detect an obstacle in various directions and a method of controlling the same. The cleaning robot includes a light emitter configured to radiate light, a plurality of light receivers configured to receive a radiation of the light in a predetermined direction among radiations of the light reflected from an obstacle when the radiated light is reflected from the obstacle, a support plate to which the light emitter and the light receiver are fixed and which is rotatably provided, and a controller configured to detect the obstacle on the basis of output signals transmitted from the light
(Continued)

emitter and the plurality of light receivers and rotation information of the support plate.

15 Claims, 23 Drawing Sheets

(51) Int. Cl.

| | |
|---|---|
| *B25J 9/16* | (2006.01) |
| *B25J 9/00* | (2006.01) |
| *B25J 11/00* | (2006.01) |
| *A47L 9/28* | (2006.01) |
| *A47L 9/00* | (2006.01) |
| *A47L 9/30* | (2006.01) |
| *A47L 11/40* | (2006.01) |

(52) U.S. Cl.
CPC ............... *A47L 9/2852* (2013.01); *A47L 9/30* (2013.01); *A47L 11/4011* (2013.01); *A47L 11/4061* (2013.01); *B25J 9/00* (2013.01); *B25J 9/16* (2013.01); *B25J 11/00* (2013.01); *B25J 11/0085* (2013.01); *B25J 19/02* (2013.01); *B25J 19/022* (2013.01); *G05D 1/02* (2013.01); *A47L 2201/04* (2013.01)

(58) Field of Classification Search
CPC .... A61B 17/00234; A61B 2017/00017; A61B 2017/00115; A61B 2017/00199; A61B 34/25; A61B 1/00006; A61B 5/742; B41J 2/125; B60S 1/02; G02B 27/01; G02B 21/084; G02B 26/06; G02B 26/08; G02B 6/00; F21Y 2115/10; F21Y 2101/00; A45D 42/10; B01L 2300/0654; B23K 26/082; B25J 9/1689; F21V 7/0058; F21V 7/0091; G02F 1/0105; A61M 2025/0019; B65G 47/252; B65G 47/915; F24C 15/008; G01M 11/31; G03G 15/161; G05D 1/0274; G05D 2201/0203; G05D 2201/0215; H04N 9/3164; H05K 2201/10106
See application file for complete search history.

(56) References Cited

U.S. PATENT DOCUMENTS

| | | | | |
|---|---|---|---|---|
| 6,496,754 | B2* | 12/2002 | Song | G05D 1/0246 |
| | | | | 700/245 |
| 7,079,923 | B2* | 7/2006 | Abramson | A47L 5/22 |
| | | | | 180/167 |
| 7,171,285 | B2* | 1/2007 | Kim | G05D 1/0253 |
| | | | | 348/47 |
| 7,359,766 | B2* | 4/2008 | Jeon | G05D 1/0225 |
| | | | | 15/319 |
| 7,430,455 | B2* | 9/2008 | Casey | G05D 1/0238 |
| | | | | 700/245 |
| 10,809,714 | B2* | 10/2020 | So | A47L 11/4013 |
| 2005/0162119 | A1* | 7/2005 | Landry | G05D 1/0272 |
| | | | | 318/580 |
| 2013/0331990 | A1* | 12/2013 | Jeong | A47L 11/4061 |
| | | | | 700/259 |
| 2014/0111812 | A1 | 4/2014 | Baeg et al. | |
| 2015/0168541 | A1 | 6/2015 | Lee et al. | |
| 2017/0001311 | A1* | 1/2017 | Bushman | A47L 9/2852 |

FOREIGN PATENT DOCUMENTS

| | | |
|---|---|---|
| KR | 10-2009-0019480 A | 2/2009 |
| KR | 10-2013-0030472 A | 3/2013 |
| KR | 10-2015-0095440 A | 8/2015 |
| KR | 10-2015-0127937 A | 11/2015 |
| WO | 2008/008970 A2 | 1/2008 |
| WO | 2016/047847 A1 | 3/2016 |

OTHER PUBLICATIONS

Lewinger et al., Obstacle Avoidance Behavior for a Biologically-inspired Mobile Robot Using Binaural Ultrasonic Sensors, 2006, IEEE, Pg. (Year: 2006).*
Dulik et al., Surface detection and recognition using infrared light, 2014, IEEE, p. 159-164 (Year: 2014).*
Palacin Building a mobile robot for a floor-cleaning operation in domestic environments, 2004, IEEE, p. 1418- (Year: 2004).*
European Search Report dated Apr. 3, 2019, issued in European Patent Application No. 17792830.6.
European Communication of notices of opposition dated Feb. 26, 2021, issued in European Application No. 17792830.6.

* cited by examiner

CLEANING ROBOT AND CONTROL METHOD THEREFOR

TECHNICAL FIELD

The present disclosure relates to a cleaning robot and a method of controlling the same, and more specifically, to a cleaning robot provided to detect an obstacle around the cleaning robot and a method of controlling the same.

BACKGROUND ART

A cleaning robot is a device that suctions foreign substance, such as dust, from the floor while traveling an area to be cleaned by itself without a user's manipulation.

In order for the cleaning robot to travel, there is a need to sense an obstacle around the cleaning robot and recognize the distance from the cleaning robot to the obstacle. To this end, the cleaning robot employs an obstacle sensing part. The obstacle sensing part measures the distribution and distance of obstacles around the cleaning robot, and the cleaning robot travels on the basis of the measured information. Accordingly, the obstacle sensing part is closely related to the traveling and cleaning performances, which are a basic element of the performance of the cleaning robot.

As the obstacle sensing part, a laser scanner, a position-sensitive diode (PSD) sensor, or the like may be used. Here, the laser scanner has limitation when used for a cleaning robot in terms of costs. In addition, when the PSD sensor is provided in a single unit, a simultaneous detection of obstacles may not be achieved, and thus a delay as much as the time required for tilting the sensor occurs, and the durability of the product may be lowered due to the tilting operation.

DISCLOSURE

Technical Problem

Therefore, it is an object of the present disclosure to provide a cleaning robot including an obstacle sensing part capable of detecting an obstacle in various directions, and a method of controlling the same.

It is another object of the present disclosure to provide a cleaning robot including at least one light emitter and at least one light receiver that are rotatably provided detect an obstacle in various directions by changing the arrangement of the light emitter and the light receiver, and a method of controlling the same.

It is another object of the present disclosure to provide a cleaning robot including a polygonal rotating mirror having a plurality of reflective surfaces at an outer circumference thereof.

It is another object of the present disclosure to provide a cleaning robot in which a reflection mirror of an obstacle sensing part is rotatably provided, and a method of controlling the same.

Technical Solution

Therefore, it is an aspect of the present disclosure to provide a cleaning robot including: a light emitter configured to radiate light; a plurality of light receivers configured to receive a radiation of the light in a predetermined direction among radiations of the light reflected from an obstacle when the radiated light is reflected from the obstacle; a support plate to which the light emitter and the light receiver are fixed and which is rotatably provided; and a controller configured to detect the obstacle on the basis of output signals transmitted from the light emitter and the plurality of light receivers and rotation information of the support plate.

The plurality of light receivers may be each disposed at a different gradient to receive light in a different direction.

The light emitter and the plurality of light receivers may be disposed to be parallel with each other on the support, or stacked to be perpendicular with each other on the support plate.

The plurality of light receivers may include a first light receiver configured to receive a radiation of light in a predetermined first direction; and a second light receiver configured to receive a radiation of light in a predetermined second direction.

The light emitter may include: a first light emitter configured to radiate light in the predetermined first direction; and a second light emitter configured to radiate light in the predetermined second direction.

The first light receiver and the first light emitter may be disposed adjacent to each other in a direction parallel to the support plate, and the second light receiver and the second light emitter are disposed adjacent to each other in a direction parallel to the support plate.

The first light receiver and the first light emitter may be stacked one on top of another in a direction perpendicular to the support plate, and the second light receiver and the second light emitter are stacked one on top of another in a direction perpendicular to the support plate.

The light emitter may radiate line light in a lengthwise direction of the cleaning robot.

The light emitter may include: a light source; and a conversion lens configured to convert light generated from the light source into the line light.

The light emitter and the plurality of light receivers may be stacked one on top of another in a direction to the support plate.

The light emitter and the plurality of light receivers may be disposed such that a light emitting position of the light emitter and a light reception position of the plurality of the light receivers are spaced apart from each other by a predetermined first distance in a direction parallel to a support surface of the support plate.

The light emitting position of the light emitter may include a light emitting position of the line light that is formed coplanar with the light reception position of the plurality of light receivers.

The cleaning robot may further include a rotary drive unit configured to rotationally drive the support plate.

The rotary drive unit may include an encoder, the rotation information may include rotation angle information of the support plate, and the controller may detect the obstacle on the basis of the rotation angle information of the support plate.

The light receiver may include at least one of a photo diode, a photo diode array, a charge-coupled device (CCD) sensor, and a complementary metal-oxide-semiconductor (CMOS) sensor.

The controller may detect the obstacle on the basis of at least one of a triangulation method and a Time of flight (TOF) method.

It is another aspect of the present invention to provide a method of controlling a cleaning robot, the method including: collecting obstacle information from the light emitter and the plurality of light receivers; collecting rotation information of the support plate from a rotary drive unit; and detecting the obstacle on the basis of output signals transmitted from the light emitter and the plurality of light receivers and the rotation information of the support plate.

The detecting of the obstacle may include detecting the obstacle on the basis of at least one of a triangulation method and a Time of flight (TOF) method.

The light emitter and the plurality of light receivers may be disposed such that a light radiating position of the light emitter and a light reception position of the plurality of the light receivers are spaced apart from each other by a predetermined first distance in a direction parallel to a support surface of the support plate, and the detecting of the obstacle may include detecting the obstacle on the basis of the first distance, light radiation angle information of the light emitter, light reception angle information of the light receiver, and rotation information of the support plate.

The detecting of the obstacle may include detecting the obstacle on the basis of a light radiation time point of the light emitter, a light reception time point of the light receiver and rotation information of the support plate.

The collecting of rotation information of the support plate includes collecting rotation angle information of the support plate.

Advantageous Effects

As is apparent from the disclosure, the present disclosure can detect an obstacle at upper side and a lower side of the cleaning robot by changing the arrangement of the light emitter and the light receiver of the obstacle sensing part.

The present disclosure can prevent an increase in the cost and decrease in the durability by only changing the arrangement of an element provided on the obstacle sensing part rather than performing a titling driving on the element such that an obstacle in various directions are detected.

MODES OF THE INVENTION

Embodiments set forth herein and illustrated in the configuration of the present disclosure are nothing but the most preferred embodiment only and do not represent all the technical spirit of the present disclosure, so that it should be understood that various equivalents and modifications can replace them.

Hereinafter, various embodiments of the cleaning robot will be described with reference to the accompanying drawings.

Figure 1:
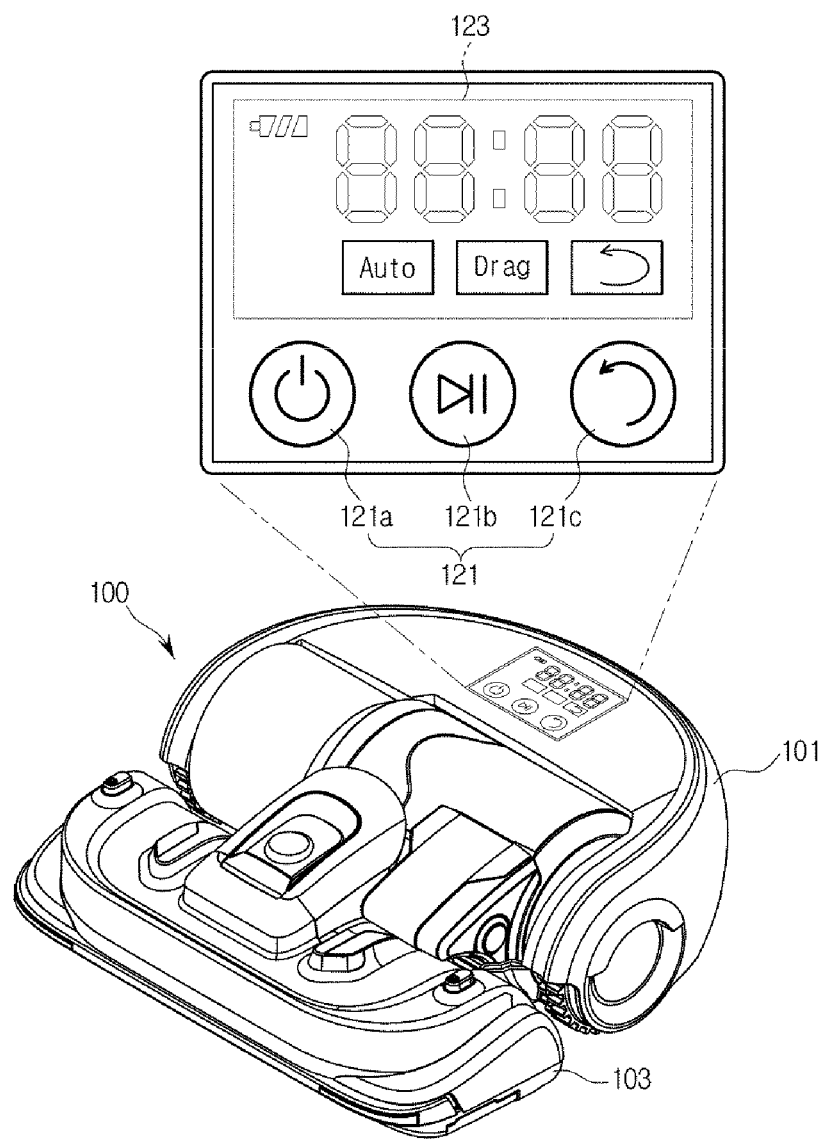
FIG. 1 is a view illustrating the appearance of a cleaning robot according to an embodiment.
Figure 2:
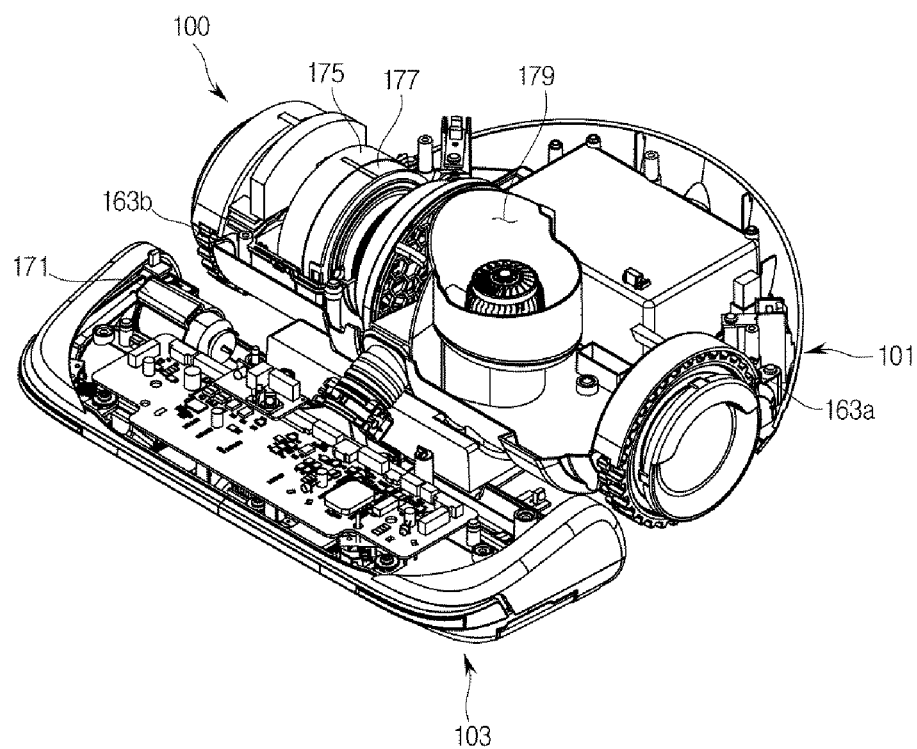
FIG. 2 is a view illustrating the interior of a cleaning robot according to an embodiment.
Figure 3:
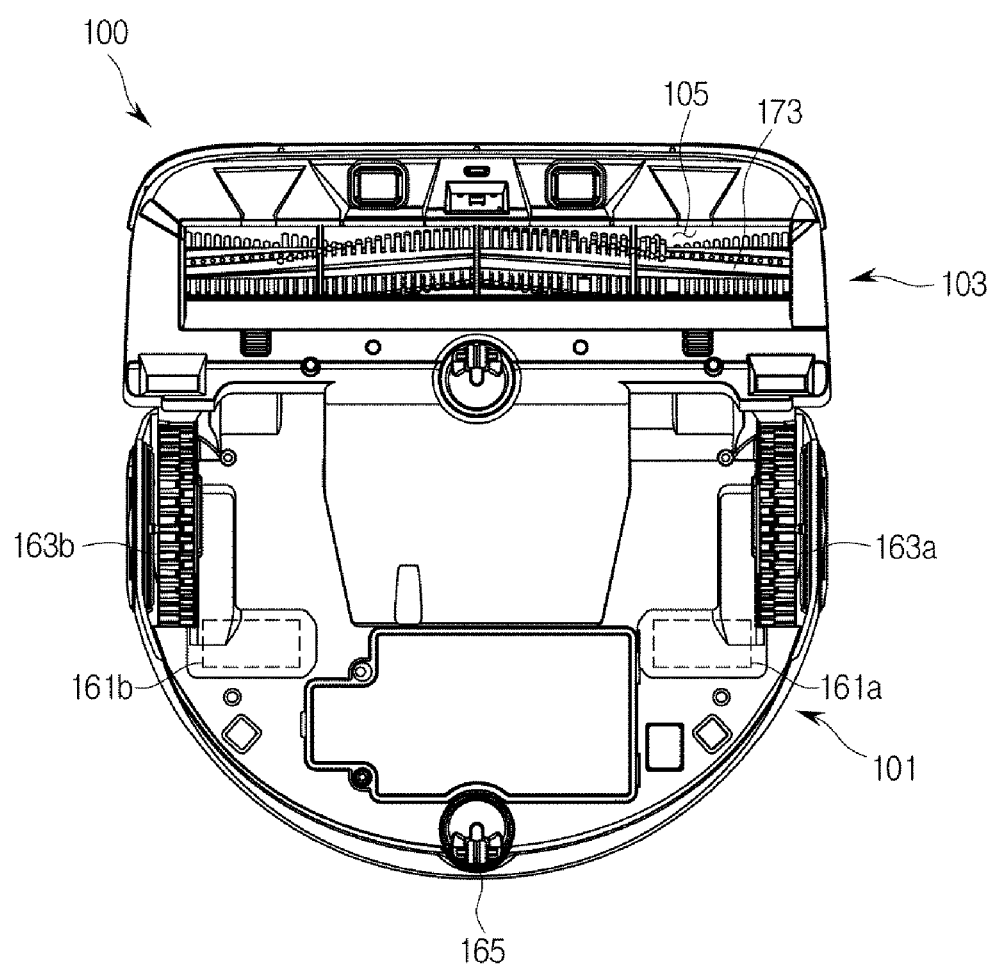
FIG. 3 is a view illustrating the bottom of a cleaning robot according to an embodiment.
Figure 4:
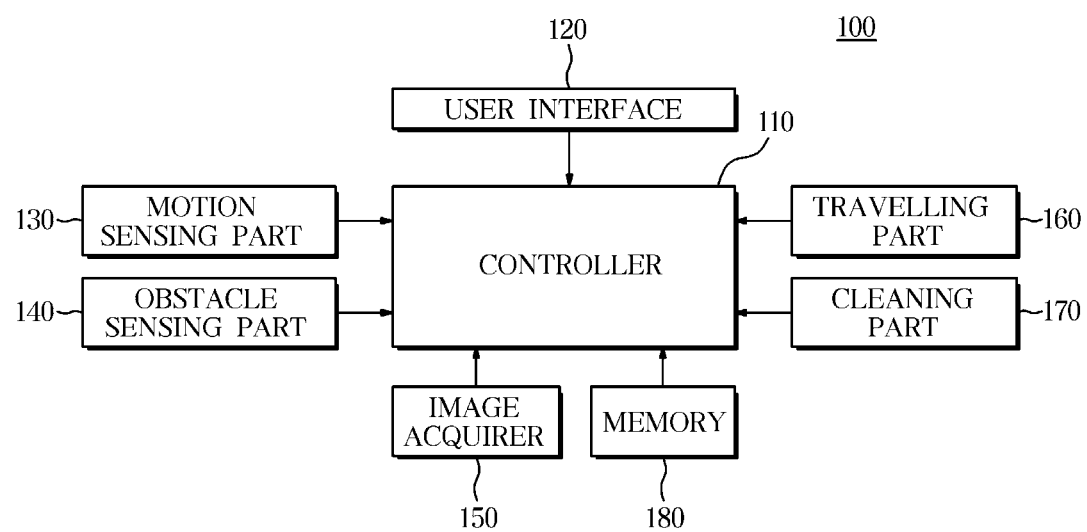
FIGS. 4 and 5 are control block diagrams of a cleaning robot according to an embodiment.
Figure 5:
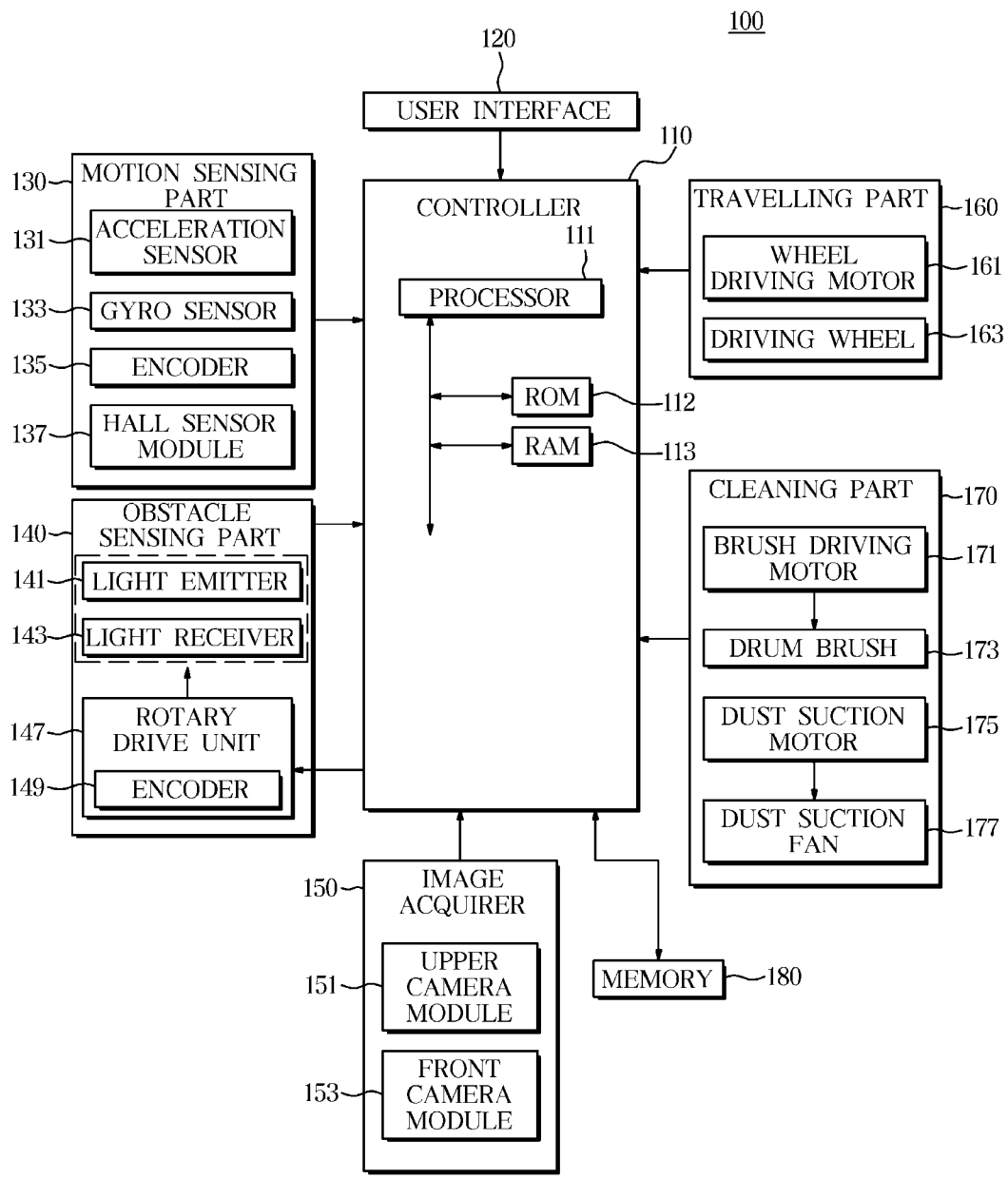

FIG. 1 is a view illustrating the appearance of a cleaning robot according to an embodiment, FIG. 2 is a view illustrating the interior of a cleaning robot according to an embodiment, FIG. 3 is a view illustrating the bottom of a cleaning robot according to an embodiment, and FIGS. 4 and 5 are control block diagrams of a cleaning robot according to an embodiment.

Referring to FIGS. 1 to 5, a cleaning robot 100 may include a main body 101 and a sub-body 103. The main body 101 may have a semicircular shape, and the sub-body 103 may have a rectangular shape as shown in FIG. 1.

However, the shape of the cleaning robot 100 is not limited to including the main body 101 and the sub-body 103, and the cleaning robot 100 may be provided as a single body or three or more bodies. In addition, the shapes of the main body 101 and the sub-body 103 are provided for optimal cleaning performance and the shapes of the main body 101 and the sub-body 103 are not limited to the semicircular shape and rectangular shape. For example, the entire body of the cleaning robot 100 may be provided in a circular or rectangular shape.

The main body 101 and the sub-body 103 may be provided at the inside and the outside thereof with components for realizing the functions of the cleaning robot 100.

In detail, the main body 101 and the sub-body 103 may be provided at the inside and the outside thereof with a user interface 120 to interact with a user, a motion sensing part 130 to detect information related to the motion of the cleaning robot 100, an obstacle sensing part 140 to sense an obstacle in a cleaning space, an image acquirer 150 to acquire a surrounding image of the cleaning robot 100, a travelling part 160 to move the cleaning robot 100, a cleaning part 170 to clean the cleaning space, a memory 180 to store programs and data related to the operation of the cleaning robot 100, and a controller 110 to control the operation of the cleaning robot 100.

Although the respective components included in the cleaning robot 100 are referred to as the user interface 120, the motion sensing part 130, the obstacle sensing part 140, the image acquirer 150, the travelling part 160, the cleaning part 170, the memory 180 and the controller 110, the respective components included in the cleaning robot 100 are not limited to the names, and may be referred to other names of components for performing the same functions as the components included in the cleaning robot 100. The user interface 120 may be provided on an upper surface of the main body 101 of the cleaning robot 100, and may include a plurality of input buttons 121 to receive a control command from a user and a display 123 to display operation information of the cleaning robot 100 as shown in FIG. 1.

The plurality of input buttons 121 include a power button 121*a* for turning the cleaning robot 100 on or off, an operation button 121*b* for operating or stopping the cleaning robot 100, and a return button 121*c* for returning the cleaning robot 100 to a charging station (not shown).

Each button included in the plurality of input buttons 121 may be provided using a push switch and a membrane switch for sensing a user's press-in, or a touch switch for sensing a touch with a part of the user's body.

The display 123 displays information about the cleaning robot 100 in response to a control command input by the user. For example, the display 123 may display an operation state of the cleaning robot 100, a power supply state, a cleaning mode selected by the user, a plan whether to return to the charging station, and the like.

The display 123 may be provided using a light emitting diode (LED), an organic light emitting diode (OLED), a liquid crystal display (LCD), or the like.

In addition, the display 123 may be provided using a touch screen panel (TSP) that receives a control command from a user and displays operation information corresponding to the received control command.

The touch screen panel may include a display for displaying operation information and a control command that may be input by a user, a touch panel for detecting coordinates of a contact made by a part of the user's body, and a touch screen controller for determining the control command input by the user on the basis of the coordinates of the contact detected by the touch panel.

The touch screen controller may compare the coordinates of the user's touch detected through the touch panel with coordinates of a control command displayed through the display to recognize the control command input by the user.

The motion sensing part 130 may sense the motion of the cleaning robot 100 while the cleaning robot 100 travels in the cleaning space.

In detail, the motion sensing part 130 may measure the acceleration, the moving speed, the displacement, and the moving direction of the cleaning robot 100 while the cleaning robot 100 linearly moves. In addition, the motion sensing part 130 may measure the rotational speed, the rotational displacement, and the turning radius of the cleaning robot 100 while the cleaning robot 100 is rotating.

The motion sensing part 130 includes an acceleration sensor 131 and a gyro sensor 133 for detecting the motion of the cleaning robot 100 and an encoder 135 and a Hall sensor module 137 for detecting the rotation of a driving wheel 163, which will be described below.

The acceleration sensor 131 may sense a linear motion. For example, the acceleration sensor 131 may measure linear acceleration, linear speed, and linear displacement of the cleaning robot 100 using Newton's second law of motion (acceleration law).

The acceleration sensor 131 may be provided using a MiCo Electro Mechanical System (MEMS) sensor that is miniaturized through combination of micromachines, microelectronics, and semiconductor process technologies.

The gyro sensor 133 is referred to as a gyroscope or an angular speed sensor and detects the rotational motion of the cleaning robot 100. In detail, the gyro sensor 133 may measure the rotational angular speed and the rotational displacement of a detection target using angular momentum conservation law, Sagnac effect, Coriolis force, and the like.

The gyro sensor 133 may also be provided using a MiCo Electro Mechanical System (MEMS) type sensor. For example, among MEMS type gyro sensors, a capacitance gyro sensor detects a deformation of a micro-mechanical structure due to a Coriolis force proportional to a rotation speed as a change in capacitance change and calculates the rotation speed from the change in capacitance.

The encoder 135 includes a light emitting element (not shown) for emitting light, a light receiving element (not shown) for receiving light, and a rotating slit (not shown) and a fixed slit (not shown) provided between the light emitting element and the light receiving element. Here, the rotating slit may be provided to rotate together with the driving wheel 163, and the fixed slit may be provided to be fixed to the main body 101.

The light emitted from the light emitting element may pass through the rotating slit to reach the light receiving element or be shut off by the rotating slit according to the rotation of the rotating slit. As a result, the light receiving element may output an electrical signal corresponding to the light received according to the rotation of the rotating slit.

In addition, the controller 110 described below may calculate the rotational motion speed and the rotational displacement of the driving wheel 163 on the basis of the electrical signal output from the light receiving element, and calculate the linear motion speed, the linear displacement, the rotational motion speed, and the rotational displacement of the cleaning robot 100 on the basis of the rotational motion speed and the rotational displacement of the driving wheel 163.

The Hall sensor module 137 may include a permanent magnet (not shown) for generating a magnetic field, and a Hall sensor (not shown) for detecting a magnetic field. Here, the permanent magnet may be provided to rotate together with the driving wheel 163, and the Hall sensor may be fixed to the main body 101.

According to the rotation of the permanent magnet, the Hall sensor may detect or not detect the magnetic field generated by the permanent magnet. As a result, the Hall sensor may output an electrical signal corresponding to the detected magnetic field according to the rotation of the permanent magnet.

In addition, the controller 110 described below may calculate the rotational motion speed and the rotational displacement of the driving wheel 163 on the basis of the electrical signal output from the Hall sensor, and calculate the linear motion speed, the linear displacement, the rotational motion speed, and the rotational displacement of the cleaning robot 100 on the basis of the rotational motion speed and the rotational displacement of the driving wheel 163.

The obstacle sensing part 140 may collect information about an obstacle that disturbs movement of the cleaning robot 100 and may transmit the information to the controller 110.

Here, the obstacle refers to all substances that protrudes from the floor of the cleaning space or is sunken from the floor of the cleaning space to disturb movement of the cleaning robot 100. Such an obstacle may include furniture, such as a table, a sofa, and the like, a wall separating the cleaning space, or a porch lower than the floor of the cleaning space.

The obstacle sensing part 140 includes a light emitter 141 that radiates light, a light receiver 143 that receives a radiation of light in a predetermined direction among from radiations of light, once having been emitted by the light emitter 141, then reflected from the obstacle, and a support plate 145 to which the light emitter 141 and the light receiver 143.

The light emitter 141 is fixed to the support plate 145 and configured to rotate clockwise or counterclockwise 360 degrees together with rotation of the support plate 145.

The light emitter 141 is an element to radiate light, and may be provided in a single unit or a plurality of units according to an embodiment.

When the obstacle sensing part 140 is provided using a single light emitter 141, the light emitter 141 may be provided to generate line light.

Figure 6:
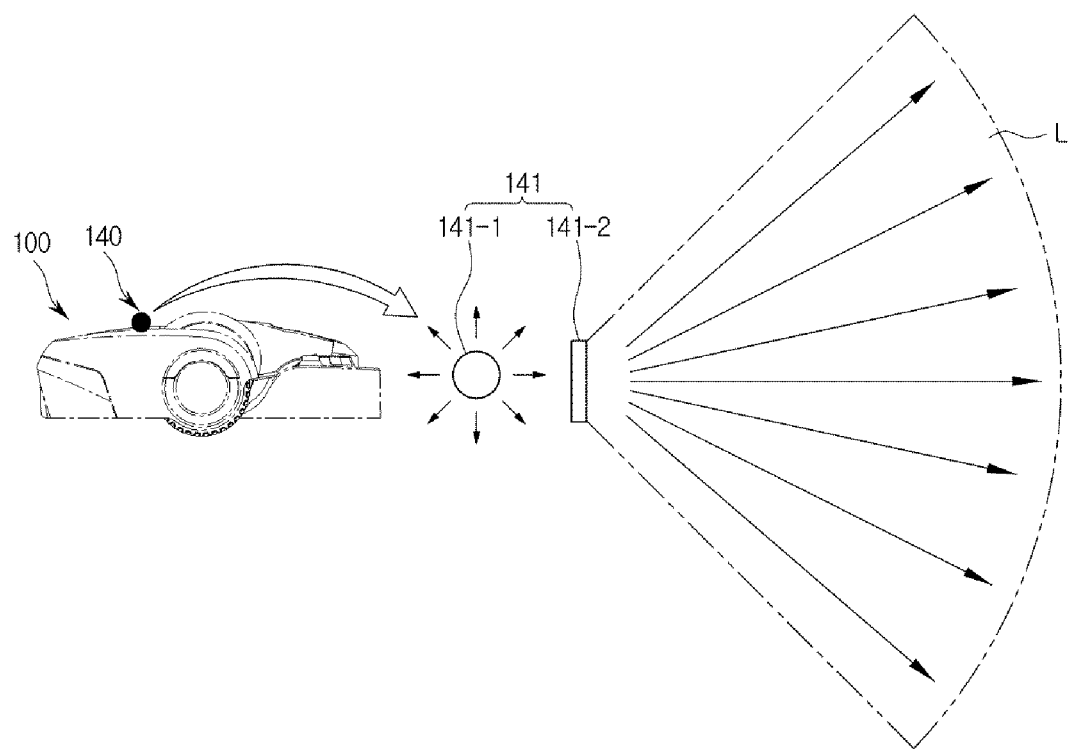
FIG. 6 is a view illustrating an example of a light emitter that generates line light.

FIG. 6 is a view illustrating an example of the light emitter 141 that generates line light.

Referring to FIG. 6, the light emitter 141 includes a light source 141-1 and a conversion lens 141-2 for converting light generated from the light source 141-1 into line light L in the lengthwise direction of the cleaning robot, and the light generated from the light source 141-1 may be converted into the line light L by passing through the conversion lens 141-2. Hereinafter, the lengthwise direction of the cleaning robot in the following description refers to the height direction of the cleaning robot, and for the sake of convenience in description may be referred to as a vertical direction.

The light source 141-1 may radiate light of infrared region. The light source 141-1 may be provided in the form of a light emitting diode (LED), but the example of the light source 141-1 is not limited thereto. For example, the light source 141-1 may be provided to radiate a laser beam according to an embodiment.

The conversion lens 141-2 may be formed of a material capable of transmitting light, and may convert light radiated from the light source 141-1 into line light in the vertical direction through refraction, total reflection, or the like. The vertical direction is defined as an upper side and lower side direction of the cleaning robot.

The cleaning robot 100 according to the present embodiment may generate line light using a single light source 141-1 by employing the conversion lens 141-2 for the light emitter 141 as shown in FIG. 6, and thereby reduce the cost incurred when a plurality of light emitters 141 are employed.

Meanwhile, the type of the light emitter 141 is not limited thereto, and when the obstacle sensing part 140 is provided using a plurality of light emitters 141, the light emitter 141 may not include a conversion lens 141-2. In addition, even when the obstacle sensing part 140 is provided using a single light emitter 141, the light emitter 141 may not include a conversion lens 141-2.

The light receiver 143 is provided to receive a radiation of light in a predetermined direction among radiations of light, once having been radiated from the light emitter 141, reflected from an obstacle. An output signal generated from light received by the light receiver 143 may be provided for an obstacle detection process of the controller 110.

The light receiver 143 may be provided in a single unit or a plurality of units, and when the light receiver 143 is provided in a plurality of units, the plurality of light receivers 143 may be disposed at different gradients to receive light in different directions. For example, when two light receivers are provided, one light receiver may be disposed such that a light-receiving surface of the one light receiver faces light reflected from an obstacle present at the upper side of the cleaning robot 100, and a light-receiving surface of the other light receiver of the cleaning robot 100 may face light reflected from an obstacle existing at the lower side of the cleaning robot 100. Hereinafter, details thereof will be described.

The light receiver 143 may include a condensing lens for gathering and concentrating the received light and an optical sensor for detecting the received light. According to the embodiment, the light receiver 143 may include an amplifier for amplifying the light detected by the optical sensor.

The optical sensor may convert light into an electrical signal and transmit the converted electrical signal to the controller 110. The optical sensor may include a photodiode, a photodiode array, a charge coupled device (CCD) sensor, a complementary metal-oxide-semiconductor (CMOS) sensor, and the like. In more detail, the photodiode may include a PN diode, a PIN diode, an APD diode, and the like. However, examples of the optical sensors are not limited thereto.

The support plate 145 may be provided to be rotatable by a rotary drive unit 147. The rotary drive unit 147 may include an encoder 149, and the encoder 149 may provide rotation angle information of the support plate 145 for the obstacle detection process of the controller 110. The rotation angle information of the support plate 145 transmitted from the encoder 149 may include direction information of an obstacle. The controller 110 may detect the obstacle on the basis of the rotation angle information of the support plate 145 transmitted from the encoder 149 of the rotary drive unit 147 along with the electrical signal output from the light emitter 141 and the light receiver 143. The detailed detection method will be described in the relevant part below.

The image acquirer 150 may include an upper camera module 151 for acquiring an image of an upper side of the cleaning robot 100, e.g., an image of a ceiling and a front camera module 153 for acquiring an image in a travelling direction of the cleaning robot 100.

The upper camera module 151 may include an image sensor (not shown) provided on the upper surface of the cleaning robot 100 to acquire the image of the upper side of the cleaning robot 100, e.g., an image of a ceiling of the cleaning space.

The front camera module 153 may include an image sensor (not shown) provided on the front surface of the cleaning robot 100 to acquire the image in a travelling direction of the cleaning robot 100.

In addition, the image sensor included in each of the upper camera module 151 and the front camera module 153 may be provided using a Complementary Metal Oxide Semiconductor (CMOS) sensor or a Charge Coupled Device (CCD) sensor.

The image acquirer 150 may output the images acquired by the upper camera module 151 and the front camera module 153 to the controller 110.

The controller 110 may determine the position of the cleaning robot 100 on the basis of the images acquired by the upper camera module 151 and the front camera module 153. In detail, the controller 110 may extract a feature point from the images acquired by the upper camera module 151 and the front camera module 153, and determine the movement distance, the movement direction, and the movement speed of the cleaning robot 100 on the basis of a change in the position of the extracted feature point. In addition, the controller 110 may determine the position of the cleaning robot 100 on the basis of the movement distance, the movement direction, and the movement speed of the cleaning robot 100.

The travelling part 160 moves the cleaning robot 100, and may include a wheel driving motor 161, a driving wheel 163, and a caster wheel 165 as shown in FIGS. 2 and 3.

The driving wheels 163 may be provided at both ends of the bottom of the main body 101 and may include a left driving wheel 163a provided on the left side of the cleaning robot 100 and a right driving wheel 163b provided on the right side of the cleaning robot 100 with respect to the front side of the cleaning robot 100.

The driving wheel 163 receives the rotational force from the wheel driving motor 161 and moves the cleaning robot 100.

The wheel driving motor 161 generates a rotational force for rotating the driving wheel 163, and includes a left side driving motor 161a for rotating the left driving wheel and a right side driving motor 161b for rotating the right driving wheel.

The left side driving motor 161a and the right side driving motor 161b may each receive a drive control signal from the controller 110 and operate independently.

The left driving wheel 163a and the right driving wheel 163b may be rotated independent of each other by the left side driving motor 161a and the right side driving wheel 161b that operate independently as described above.

In addition, since the left driving wheel 163a and the right driving wheel 163b may independently rotate, the cleaning robot 100 may perform various travels, such as forward travel, backward travel, rotational travel, and in-situ rotation.

For example, when both the left driving wheel 106a and the right driving wheel 163b rotate in a first direction, the cleaning robot 100 linearly moves forward (advances), and both the left driving wheel 163a and the right driving wheel 163b rotate in a second direction, the cleaning robot 100 linearly moves backward.

In addition, when the left driving wheel 163a and the right driving wheel 163b rotate in the same direction but rotate at different speeds, the cleaning robot 100 may rotate clockwise or counterclockwise in place.

The caster wheel 165 is installed on the bottom surface of the main body 101 without interfering with the cleaning robot 100 from travelling, and allows the cleaning robot 100 to travel while maintaining a stable posture.

In addition, the travelling part 160 may further include a motor driving circuit for supplying a driving current to the wheel driving motor according to a control signal from the controller 110, a power transmission module for transmitting the rotational force of the wheel driving motor to the driving wheels, and a rotation detecting sensor (not shown) for detecting a rotational displacement and a rotational motion speed of the wheel driving motor or the driving wheel.

The cleaning part 170 includes a drum brush 173 for scattering dust on the floor of the cleaning area, a brush driving motor 171 for rotating the drum brush 173, a dust suction fan 177 for sucking scattered dust, a dust suction motor 175 for rotating the dust suction fan 177, and a dust box 179 for storing the suctioned dust.

The drum brush 173 is provided on a dust suction port 105 formed on the bottom surface of the sub-body 103 and rotates around a rotation axis of the sub-body 103 provided to be parallel with the floor to be cleaned, to scatter dust on the floor toward the inside of the dust suction port 105.

The brush driving motor 171 is provided adjacent to the drum brush 173 to rotate the drum brush 173 according to a cleaning control signal of the controller 110.

Although not shown in the drawings, the cleaning part 170 includes a motor driving circuit (not shown) for supplying a driving current to the brush driving motor 171 according a control signal from the controller 110, and a power transmission module for transmitting a rotational force of the brush driving motor 171 to the drum brush 173.

The dust suction fan 177 is provided in the main body 101 as shown in FIG. 2, and suctions the dust scattered by the drum brush 173 into the dust box 179.

The dust suction motor 175 is provided at a position adjacent to the dust suction fan 177 and rotates the dust suction fan 177 according to a control signal of the controller 110.

Although not shown in the drawing, the cleaning part 170 may further includes a motor driving circuit (not shown) for supplying a driving current to the dust suction motor 175 according to a control signal from the controller 110, and a power transmission module (not shown) for transmitting a rotational force of the dust suction motor 175 to the dust suction fan 177.

The dust box 179 is provided in the main body 101 as shown in FIG. 2, and stores the dust suctioned by the dust suction fan 177.

In addition, the cleaning part 170 may include a dust guide pipe for guiding the dust suctioned through the dust suction port 105 of the sub-body 103 to the dust box 179 provided in the main body 101.

The memory 180 may store control programs and control data for controlling the cleaning robot 100, and various application programs and application data that perform various functions according to a user' input.

For example, the memory 180 stores an Operating System (OS) program for managing the configuration and resources (software and hardware) included in the cleaning robot 100, a data processing program for processing electrical signals obtained from the obstacle sensing part 140, an obstacle detecting program for detecting an obstacle on the basis of an electrical signal obtained from the obstacle sensing part 140, and a motor control program for controlling a drive motor included in the travelling part 160 and a drive motor included in the rotary drive unit 147 of the support plate 145.

The memory 180 may include a volatile memory, such as an S-RAM and a D-RAM, and a non-volatile memory, such as a flash memory, a Read Only Memory (ROM), an erasable programmable read only memory (EPROM), an electrically erasable programmable read only memory (EEPROM) or the like.

In detail, the non-volatile memory may semi-permanently store control programs and control data for controlling the operation of the cleaning robot 100, and the volatile memory may temporarily store control programs and control data loaded from the non-volatile memory, or temporarily store a user command received by the user interface 120, motion information detected by the motion sensing part, and position information of an obstacle detected by the controller 110.

The controller 110 controls the overall operation of the cleaning robot 100 and a flow of signals between the internal components of the cleaning robot 100 and processes data. The controller 110 may execute a program or an application stored in the memory 180 when a command is input from a user or a predetermined condition is satisfied.

The controller 110 may include a processor 111, a ROM 112 that stores a control program or application for controlling the cleaning robot 100, a RAM 113 that stores a signal or data input from the outside of the cleaning robot 100 or serves as a storage area corresponding to various operations performed by the cleaning robot 100. Hereinafter, the ROM 112 and the RAM 113 of the controller 110 may be a concept including a ROM and a RAM of the memory 180.

The controller 110 may detect an obstacle on the basis of an electrical signal output from the obstacle sensing part 140 and information stored in the memory 180. In more detail, the controller 110 may detect an obstacle according to a triangulation method or a time of flight (TOF) method.

The controller 110 may determine the method of detecting an obstacle according to the design of the obstacle sensing part 140.

The triangulation method may be easily applied when the distance from the light emitting position of the light emitter 141 to the light reception position of the light receiver 143 is set to be spaced apart from each other by a certain distance or more. This is because the distance from the light emitting position of the light emitter 141 to the light reception position of the light receiver 143 is provided as an input variable when the triangulation method is used.

The TOF method may be easily applied when the distance from the light emitting position of the light emitter 141 to the light reception position of the light receiver 143 is less than a certain distance. This is because the TOF based obstacle detection operates under the assumption that light is emitted and received at the same position.

Hereinafter, the triangulation method and the TOF method will be described in more detail with reference to the accompanying drawings.

Figure 7:
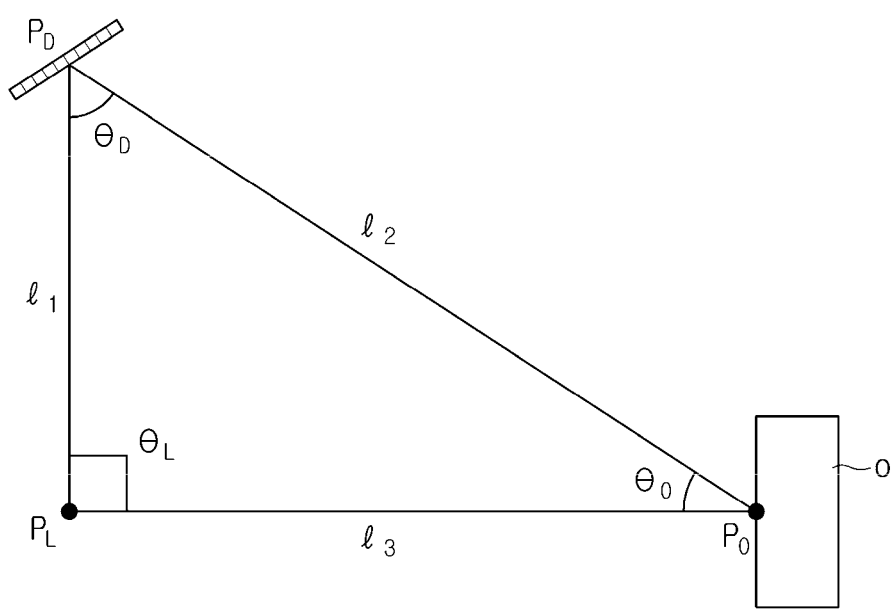
FIG. 7 is a view illustrating the principle of triangulation.

FIG. 7 is a view illustrating the principle of triangulation.

The triangulation method measures the length of one side of a triangle and both angles of the corresponding side to calculate the lengths of the other two sides and the remaining angle. Here, the length of the one side of the triangle may represent the distance from the light emitting position of the light emitter 141 to the light reception position of the light receiver 143. When line light L is emitted from the light emitter 141 according to the embodiment, the emitting position of the light emitter 141 may represent a position existing on the line of the line light L, and located on a plane including the light reception position of the light receiver 143 among virtual planes provided to be parallel with a support surface of the support plate 145.

Referring to FIG. 7, the controller 110, on the basis of a distance $1_1$ from a light emitting position $P_L$ of the light emitter 141 to a light reception position $P_D$ of the light receiver 143, a light radiation angle $\Theta L$ of the light emitter 141, and a light reception angle $\Theta_D$ of the light receiver 143, may detect lengths $1_2$ and $1_3$ of other sides and the remaining angle $\Theta_o$. That is, the distance $1_3$ from the cleaning robot 100 to the obstacle O may be detected.

Next, the TOF method uses the time difference between the time when light is radiated from the light emitter 141 and the time when the emitted light is reflected by the obstacle O and then returns to the light receiver 143, to detect the distance from the cleaning robot 100 to the obstacle O. The controller 110 may detect the distance from the cleaning robot 100 to the obstacle O on the basis of Equation 1 expressed below.

$$d=(t1-t0)/2*c=\Delta t/2*c \qquad \text{Equation 1}$$

In Equation 1, d represents the distance from the obstacle sensing part 140 to the obstacle O, c represents the speed of light, t1 represents the time at which light is received by the light receiver 143, and t0 represents the time at which light is radiated by the light emitter 141.

The implementation of the TOF method is not limited to the above-described Equation 1, and according to an embodiment, the phase difference between light radiated from the light emitter 141 and light received by the light receiver 143 may be detected and the distance from the cleaning robot 100 to the controller may be detected.

In the above, the basic structure of the cleaning robot 100 has been described. Hereinafter, the obstacle sensing part 140 of the cleaning robot 100 will be described in more detail.

The cleaning robot 100 according to the embodiment may freely change the number and arrangement of the light emitter 141 and the light receiver 143 provided in the obstacle sensing part 140.

As an example, the light emitter 141 and the light receiver 143 may be stacked one on top of another in a direction perpendicular to the support plate 145. The light emitter 141 and the light receiver 143 may be provided in a single unit or in a plurality of units, and according to an embodiment, the light emitter 141 and the light receiver 143 may form a sensor module.

As another example, the light emitter 141 and the light receiver 143 may be disposed in a directional parallel to the support plate 145. The light emitter 141 and the light receiver 143 may be provided in a single unit or in a plurality of units, and the light emitter 141 and the light receiver 143 may form a sensor module.

Hereinafter, a method of providing the obstacle sensing part 140 will be described in more detail with reference to the accompanying drawings.

Figure 8:
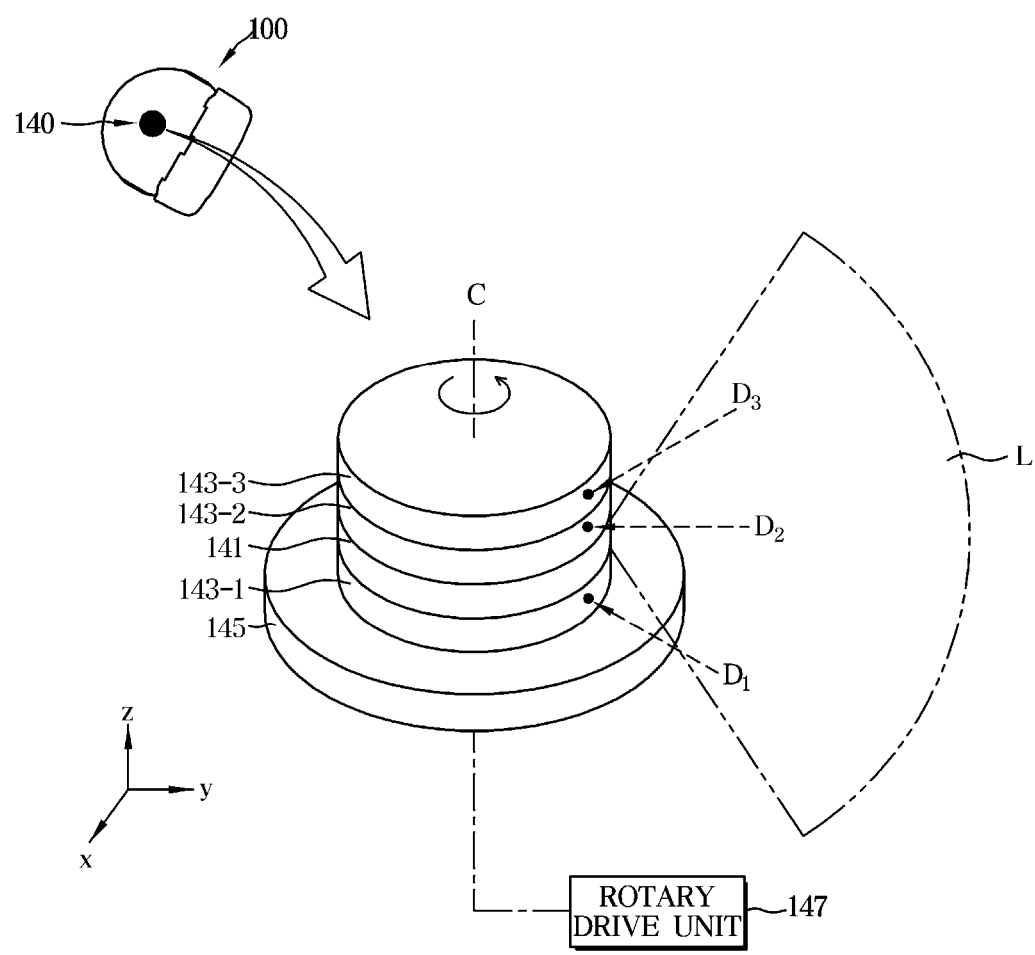
FIGS. 8 and 9 are views illustrating a way to arrange a light emitter and a light receiver according to an embodiment.
Figure 9:
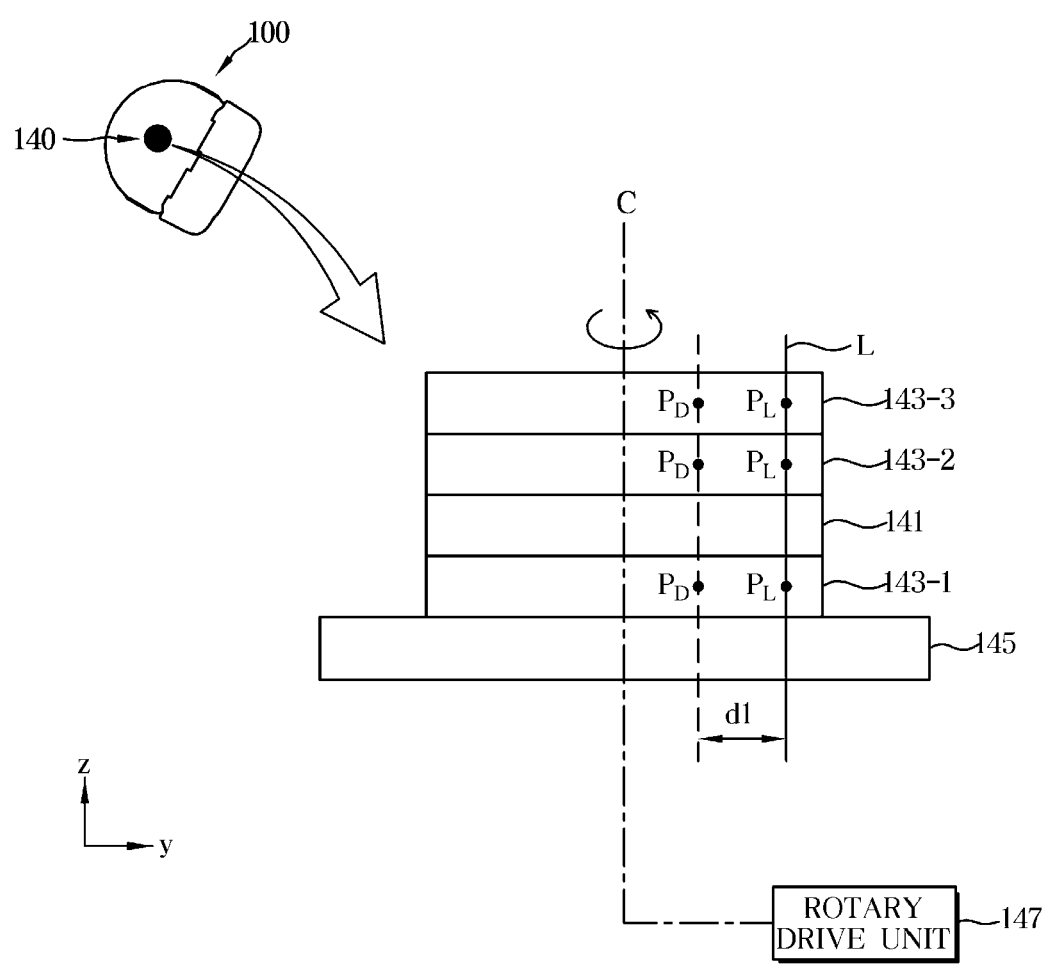
Figure 10:
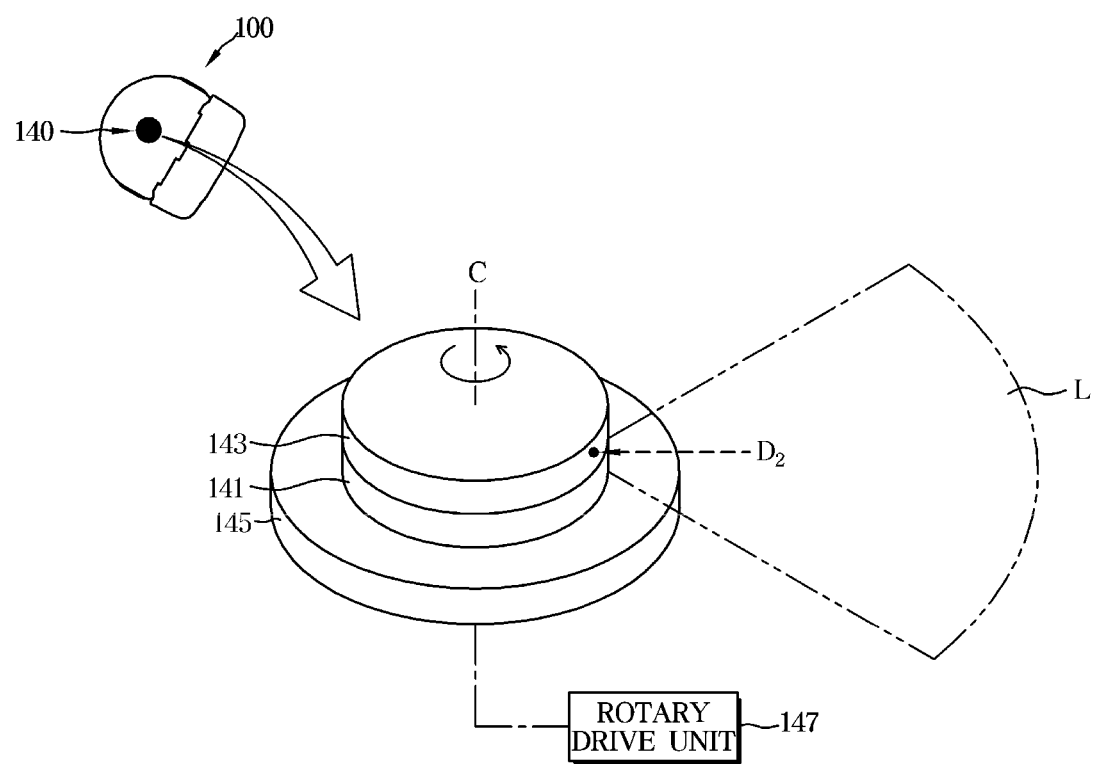
FIG. 10 is a view illustrating a way to arrange a light emitter and a light receiver according to another embodiment.
Figure 11:
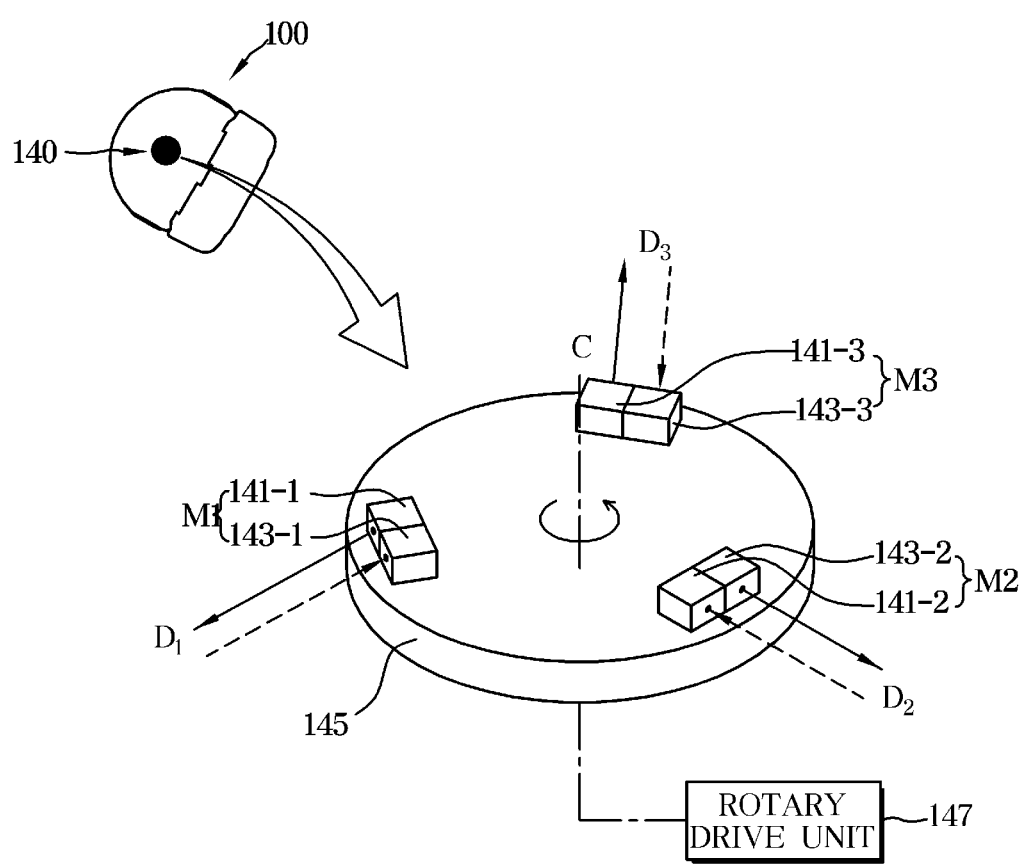
FIGS. 11 to 13 are views illustrating a way to arrange a light emitter and a light receiver according to another embodiment.
Figure 12:
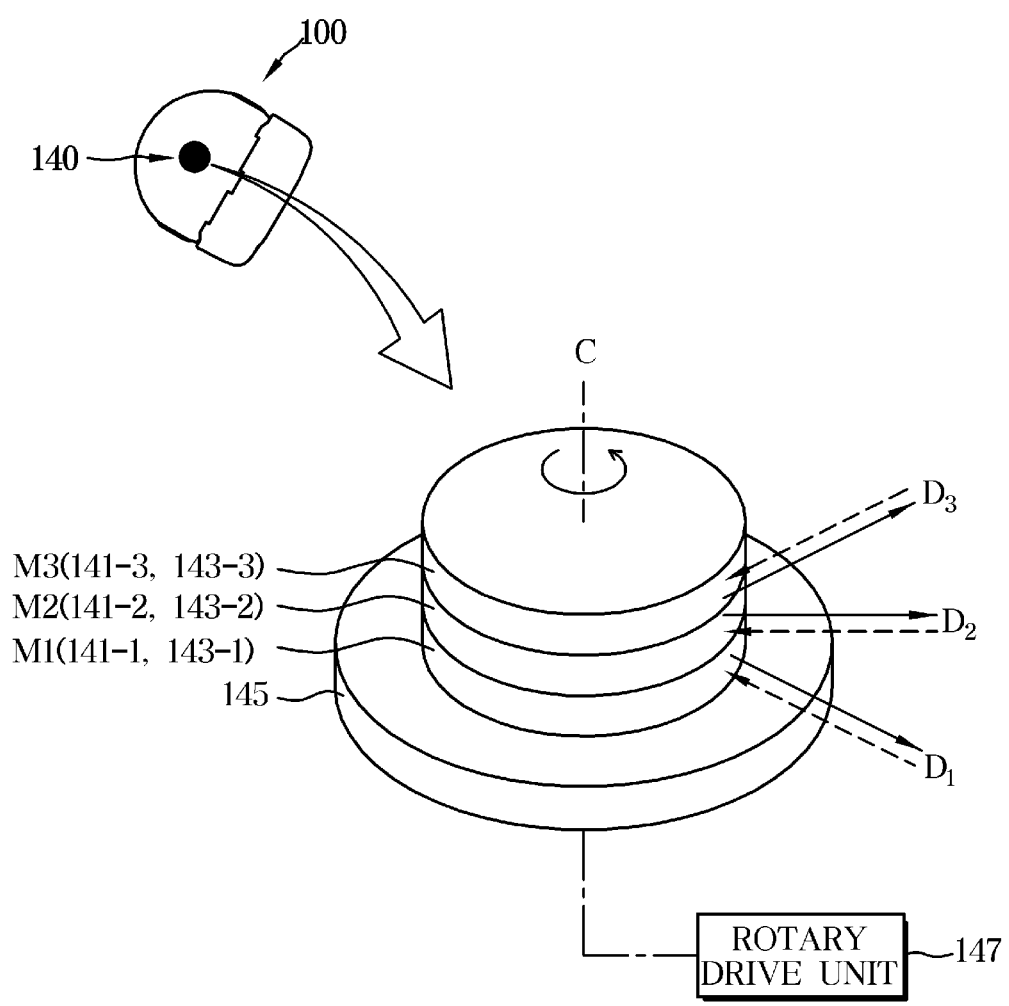
Figure 13:
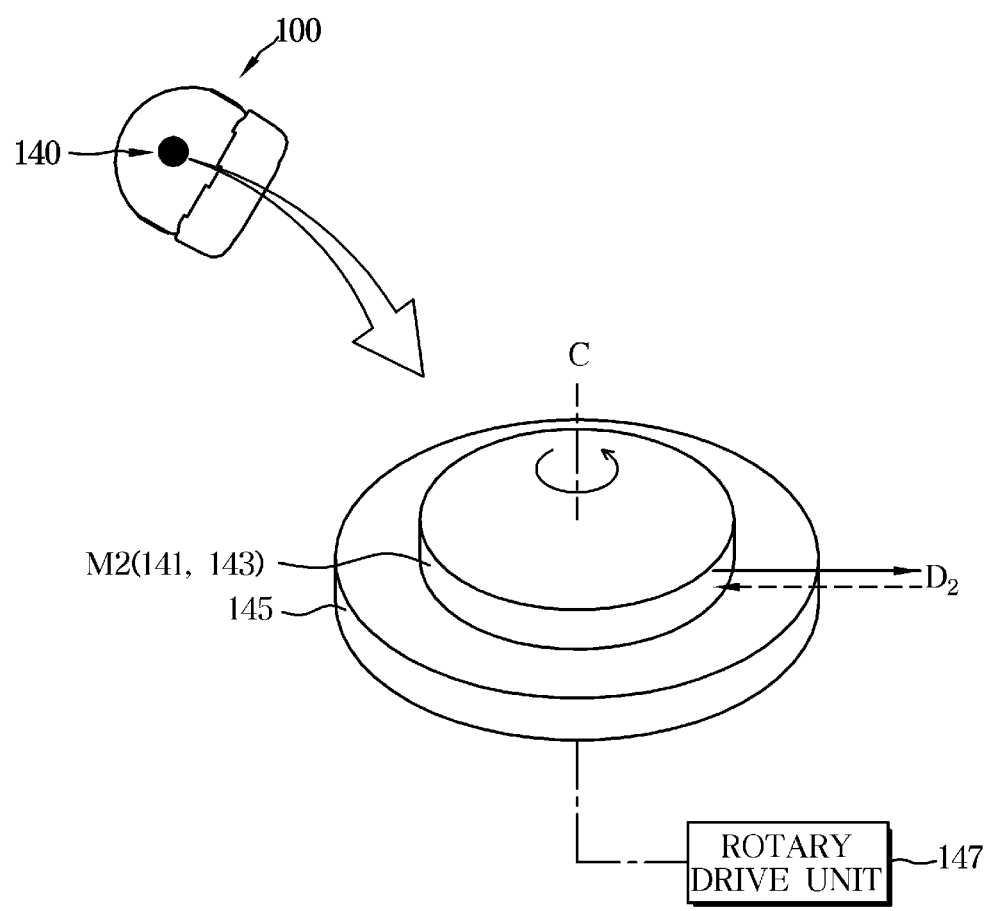

FIGS. 8 and 9 are views illustrating a way to arrange the light emitter 141 and the light receiver 143 according to an embodiment, FIG. 10 is a view illustrating a way to arrange the light emitter 141 and the light receiver 143 according to another embodiment, and FIGS. 11 to 13 are views illustrating a way to arrange the light emitter 141 and the light receiver 143 according to another embodiment.

In more detail, FIGS. 8 to 10 are views showing the arrangement of the light emitter 141 and the light receiver 143 on the assumption that the light emitter 141 transmits line light L, and FIGS. 11 to 13 are views showing the arrangement the light emitter 141 and the light receiver 143 on the assumption that the light emitter 141 transmits a laser beam.

First, referring to FIGS. 8 and 9, an arrangement of the obstacle sensing part 140 according to an embodiment will be described.

Referring to FIG. 8, an obstacle sensing part 140 according to the embodiment may include a single light emitter 141 and a plurality of light receivers 143-1, 143-2, and 143-3 that are stacked one on top of another on a support plate 145.

For example, the obstacle sensing part 140 may include a support plate 145, a first light receiver 143-1 disposed on the support plate 145 and configured to receive a radiation of light in a predetermined first direction D1, a light emitter 141 disposed on the light receiver 143-1 and configured to emit line light L in the vertical direction, and a second light receiver 143-2 disposed on the light emitter 141 to receive a radiation of light in a predetermined second direction D2, and a third light receiver 143-3 disposed on the second light receiver 143-2 to receive a radiation of light in a predetermined third direction D3. It should be understood that the stacking order of the light emitter 141 and the first to third light receivers may be varied according to embodiments.

The respective radiations of light in the first to third directions D1, D2, and D3 may be radiations of light in different directions. For example, assuming that the cleaning robot 100 is located in the xy plane on the x, y, and z coordinate system, the first direction may be a diagonal downward direction with respect to the xy plane, the second direction may be a certain direction on the same plane as the xy plane, and the third direction may be a diagonal upward direction with respect to the xy plane.

Referring to FIG. 9, the light emitter 141 and the light receiver 143 of the obstacle sensing part 140 may be disposed such that the light emitting position $P_L$ of the light emitter 141 and the light reception position PD of the light receiver 143 are spaced apart from each other by a predetermined first distance d1 in a direction parallel to the support surface of the support plate 145. Hereinafter, the light radiation position $P_L$ of the light emitter 141 is defined as a light radiation position of line light L formed on the same plane on which the light reception position $P_D$ of the light receiver 143 is provided.

The first distance d1 may be set differently depending on the sensing method of the obstacle sensing part 140. For example, when the obstacle sensing part 140 senses the obstacle O by the TOF method, the first distance d1 may be set to be shorter than when the obstacle O is sensed using the triangulation method as described above.

Referring to FIGS. 8 and 9, the single light emitter 141 transmits line light L in the vertical direction, and the first to third light receivers 143-1, 143-2, and 143-3 receive a radiation of light reflected from the obstacle O among the radiations of line light L radiated from the single light emitter 141.

The first to third light receivers 143-1, 143-2, and 143-3 may be inclined to face in a direction of desired light. In more detail, the first light receiver 143-1 may be arranged to receive radiation of light reflected from an obstacle existing at the lower side of the cleaning robot among the radiations of line light L radiated from the light emitter 141. For example, the first light receiver 143-1 may be disposed such that the light reception surface of the first light receiver 143-1 is inclined to face in the first direction D1.

In the same manner, the second light receiver 143-2 may be disposed such that the light reception surface of the second light receiver 143-2 is inclined to face in the second direction D2, and the third light receiver 143-3 is disposed such that the light reception surface of the third light receiver 143-3 is inclined to face in the third direction D3.

It should be understood that the arrangement angle of the first to third light receivers 143-1 to 143-3 may be adjusted according to the height, the depth, and the like of an obstacle O.

Then, a method of arranging the obstacle sensing part 140 according to another embodiment will be described with reference to FIG. 10.

Referring to FIG. 10, the obstacle sensing part 140 according to the embodiment may include a single light emitter 141 and a single light receiver 143 stacked one on top of another on a support plate 145.

For example, the obstacle sensing part 140 includes a support plate 145, a light emitter 141 disposed on the support plate 145 to radiate line light L, and alight receiver 143 disposed on the light emitter 141 to receive a radiation of light in a predetermined direction. Although the light receiver 143 is illustrated as receiving a radiation of light in the second direction D2 in FIG. 10, the predetermined direction may be freely designed according to the designer's intention. In the following description of the arrangement of the light emitter 141 and the light receiver 143, details of parts identical to those described with reference FIGS. 8 and 9 will be omitted.

Although FIGS. 8 to 10 illustrate an example in which the light emitter 141 transmits line light L, but the inventive concept of the present disclosure is not limited to the illustration of FIGS. 8 to 10. In other words, a plurality of light emitters 141 may be provided to transmit line light L, and according to embodiments, the light receiver 143 may be provided in two, or four or more units thereof. In addition, the stacking order of the light emitter 141 and the light receiver 143 may be variously changed.

Then, an example of the obstacle sensing part 140 according to still another embodiment will be described with reference to FIG. 11.

Referring to FIG. 11, the obstacle sensing part 140 according to the embodiment may include a plurality of light emitters 141-1, 141-2, and 141-3 and a plurality of light receivers 143-1 and 143-2 and 143-3 arranged to be parallel with each other on the upper surface of the support plate 145.

For example, the obstacle sensing part 140 includes a support plate 145, a first light emitter 141-1 disposed on the support plate 145 to radiate light in the first direction D1, and a first light receiver 143-1 disposed to be parallel with the light emitter 141-1 to receive light in the first direction D1. According to an embodiment, the first light emitter 141-1 and the first light receiver 143-1 may be provided as a module. Hereinafter, an optical module including the first light emitter 141-1 and the first light receiver 143-1 will be referred to as a first optical module M1.

In addition, the obstacle sensing part 140 includes a second light emitter 141-2 that radiates light in the second direction D2 and a second light receiver 143-2 that is disposed to be parallel with the second light emitter 141-2 to receive light in the second direction D2, and a third light emitter 141-3 that radiates light in the third direction D3 and a third light receiver 143-3 that is disposed to be parallel with the third light emitter 141-3 to receive light in the third direction D3.

According to the embodiment, the second light emitter 141-2 and the second light receiver 143-2 may form a second optical module M2, and the third light emitter 141-3 and the third light receiver 143-3 may form a third optical module M3.

The first to third optical modules M1 to M3 may be disposed side by side on the edge of the support plate 145. For example, the first to third optical modules M1 to M3 may be disposed to be spaced apart from each other at each interval of 120 degrees with respect to the central portion of the support plate 145.

The obstacle sensing part 140 includes the first to third optical modules M1, M2, and M3 as described above, and operates to rotate the support plate 145 clockwise or counterclockwise, to collect information about obstacles O existing in the first to third directions D1 to D3.

Meanwhile, the first to third optical modules M1 to M3 may be vertically stacked on the support plate 145 as shown in FIG. 12, or according to an embodiment, may be provided in a single optical module (M) as shown in FIG. 13. Meanwhile, the inventive concept of the present disclosure is not limited to that shown in the drawings, and two, or four or more optical modules may be horizontally provided on the edge of the support plate 145 or vertically stacked on the support plate 145.

In the above, various arrangements of the obstacle sensing part 140 have been described. The obstacle sensing part 140 of the cleaning robot 100 according to the embodiment of the present disclosure collects information about an obstacle O while rotating with the light emitter 141 and the light receiver 143 fixed to the support plate 145.

Meanwhile, the cleaning robot may collect information about an obstacle (O) by employing various types of obstacle sensing parts. Hereinafter, examples of various obstacle sensing parts will be described.

The obstacle sensing part of the cleaning robot may be provided to collect information about an obstacle O around the cleaning robot using a polygonal rotating mirror or a reflection mirror. Hereinafter, each embodiment will be described in more detail.

First, an embodiment of a cleaning robot including a polygonal rotating mirror will be described.

Figure 14:
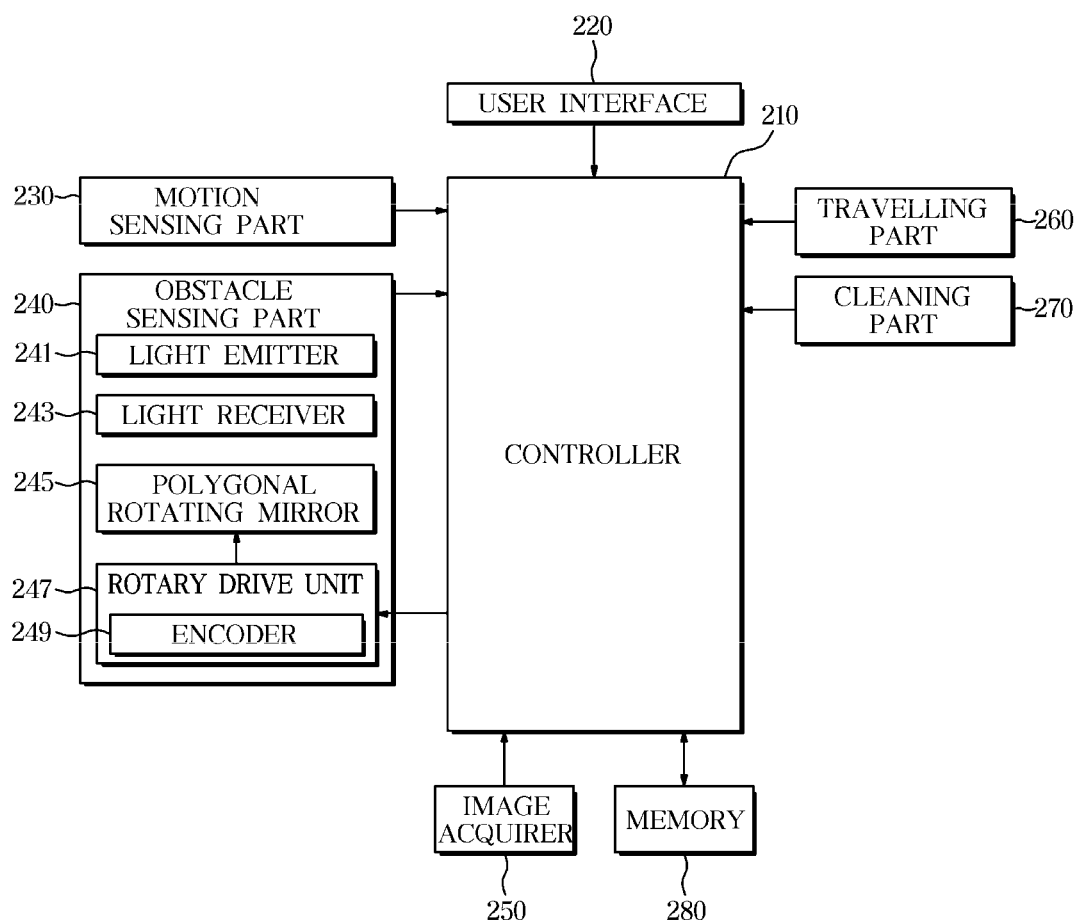
FIG. 14 is a control block diagram illustrating a cleaning robot according to another embodiment.
Figure 15:
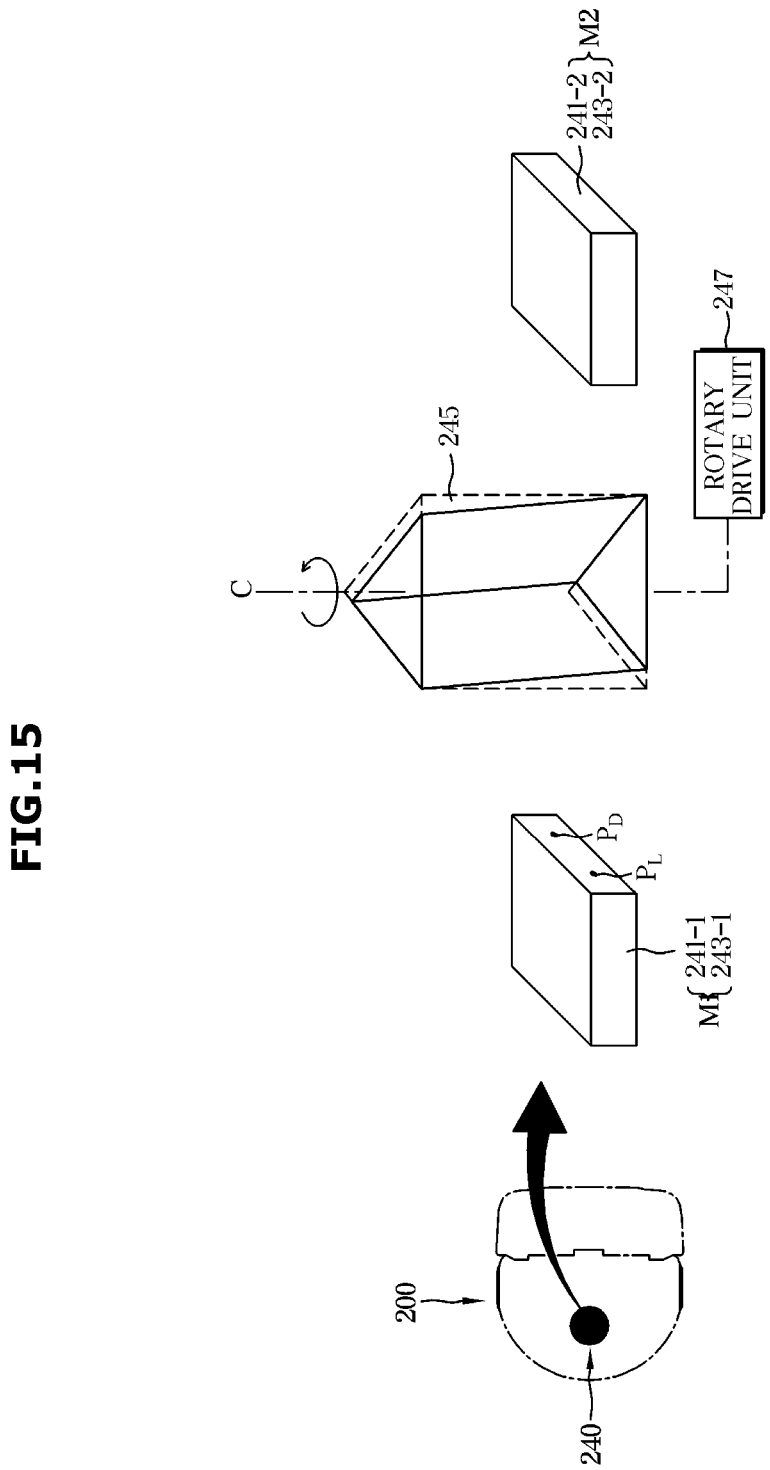
FIG. 15 is a view illustrating an example of an obstacle sensing part of a cleaning robot according to another embodiment.
Figure 16:
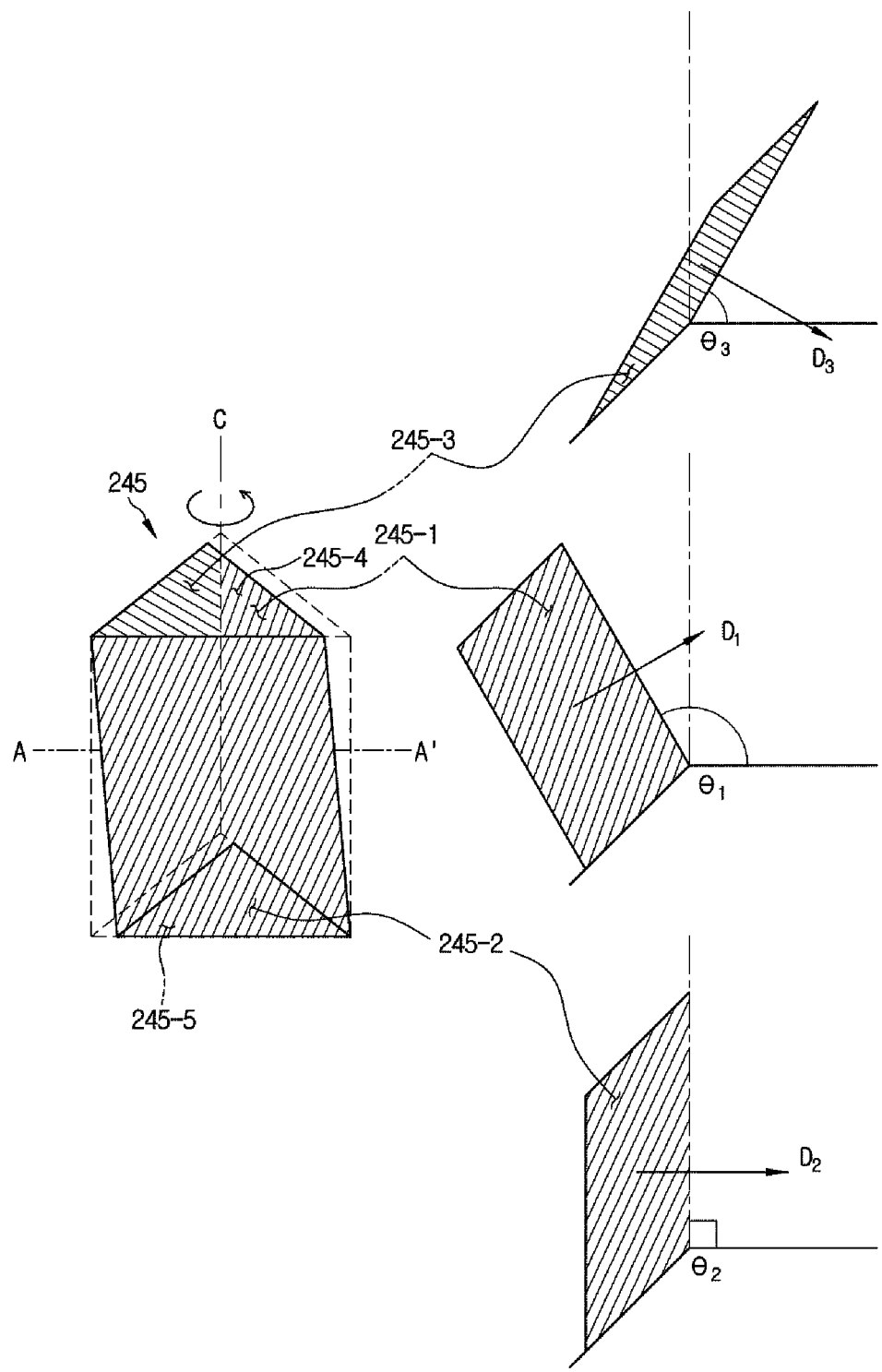
FIG. 16 is a view illustrating a detailed structure of a polygonal rotating mirror.

FIG. 14 is a control block diagram illustrating a cleaning robot according to another embodiment, FIG. 15 is a view illustrating an example of an obstacle sensing part of a cleaning robot according to another embodiment, and FIG. 16 is a view illustrating a detailed structure of a polygonal rotating mirror.

Referring to FIG. 14, a cleaning robot 200 includes a user interface 220, a motion sensing part 230, an obstacle sensing part 240, an image acquirer 250, a cleaning part 270, a memory 280, and a controller 210. In the following description of the user interface 220, the motion sensing part 230, the image acquirer 250, the cleaning part 270, and the memory 280, details of parts identical to those described with reference FIGS. 4 and 5 will be omitted.

Referring to FIG. 15, the obstacle sensing part 240 includes a light emitter 241, a light receiver 243, a polygonal rotating mirror 245, and a rotary drive unit 247 configured to rotationally drive the polygonal rotating mirror 245.

The light emitter 241 may radiate light in a direction toward the polygonal rotating mirror 245, and the light receiver 243 may receive light reflected from the polygonal rotating mirror 245. Since the obstacle sensing part 240 according to the embodiment detects an obstacle O by the TOF method, the light emitter 241 and the light receiver 243 may be disposed such that the light emitting position of the light emitter 241 and the light reception position of the light receiver 243 are adjacent to each other.

The light emitter 241 and the light receiver 243 may be each provided in a single unit or in a plurality of units thereof. For example, the light emitter 241 may include a first light emitter 241-1 and a second light emitter 241-2. The light receiver 243 may include a first light receiver 243-1 and a second light receiver 243-2. The first light emitter 241-1 and the first light receiver 243-1 may form a first optical module M1 and a second light emitter 241-2 and a second light receiver 243-2 may form a second optical module M2. According to an embodiment, the light emitter 241 and the light receiver 243 may be provided in three or more optical modules, and the following description is made in relation that the light emitter 241 and the light receiver 243 form the first and second optical modules M1 and M2.

The polygonal rotating mirror 245 converts the optical path of light radiated from the light emitter 241 to be directed to the cleaning region to detect an obstacle O in the cleaning region, and converts the optical path of light introduced into the polygonal rotating mirror 245 among radiations of light reflected from the obstacle O to be directed to the light receiver 243.

The polygonal rotating mirror 245 may be disposed between the first optical module M1 and the second optical module M2 to secure a wide sensing area, and may be rotated clockwise or counterclockwise 360 degrees around a virtual rotation axis c formed at the center of the polygonal rotating mirror 245.

The polygonal rotating mirror 245 is provided in the form of an inclined triangular pillar to secure a wide sensing area in the vertical direction of the cleaning robot 200. Hereinafter, the structure of the polygonal rotating mirror 245 will be described in more detail with reference to the accompanying drawings.

Referring to FIG. 16, the polygonal rotating mirror 245 according to the embodiment may be provided with three reflective surfaces 245-1, 245-2, and 245-3 at an outer circumference thereof. However, the polygonal rotating mirror 245 is not limited thereto, and may be provided with four or five reflective surfaces. The following description will be made in relation to the polygonal rotating mirror 245 having three reflective surfaces 245-1, 245-2 and 245-3 at the outer circumference thereof as an example, the three reflective surfaces 245-1, 245-2, and 245-3 including a first reflective surface 245-1, a second reflective surface 245-2, and a third reflective surface 245-3.

At least one of the three reflective surfaces 245-1, 245-2, and 245-3 may be formed to be inclined with respect to the rotation axis c of the polygonal rotating mirror 245. For example, the polygonal rotating mirror 245 includes a upper surface 245-4 and a bottom surface 245-5, which are provided to be flat, a first reflective surface 245-1 inclined by a first angle $\Theta_1$ with respect to the bottom surface 245-5 of the polygonal rotating mirror 245 toward the rotation axis c of the polygonal rotating mirror 245, a second reflective surface 245-2 inclined by a second angle $\Theta_2$ with respect to the bottom surface 245-5 toward the rotation axis c of the polygonal rotating mirror 245, and a third reflective surface 245-3 inclined by a third angle $\Theta_3$ with respect to the bottom surface 245-5 toward the rotation axis c of the polygonal rotating mirror 245.

Here, the first angle, the second angle, and the third angle $\Theta_1$, $\Theta_2$, and $\Theta_3$ may be formed different from each other, and may be each formed within a range of 0 degree to 180 degrees. Hereinafter, an embodiment of the present disclosure will be described on the assumption that the first angle $\Theta_1$ is formed at an obtuse angle, the second angle $\Theta_2$ is formed at the right angle, and the third angle $\Theta_3$ is formed at an acute angle.

The first reflective surface 245-1 is formed to be inclined at the first angle $\Theta_1$ to convert the optical path of light radiated from the light emitter 241 to be directed in a predetermined first direction D1 as shown in FIG. 16. In addition, the first reflective surface 245-1 converts the optical path of a radiation of light in the first direction $D_1$ among radiations of light reflected from the obstacle O to be directed to the light receiver 243.

In the same manner, since the second reflective surface 245-2 is formed to be inclined at the second angle $\Theta_2$, the optical path of light radiated from the light emitter 241 may be converted to be directed in a predetermined second direction D2, and the optical path of a radiation of light in the second direction D2 among radiations of light reflected from the obstacle O may be converted to be directed to the light receiver 243.

In addition, since the third reflective surface 245-3 is formed to be inclined at the third angle $\Theta_3$, the optical path of light radiated from the light emitter 241 may be converted to be directed in a predetermined third direction D3, and the optical path of a radiation of light in the third direction D3 among radiations of light reflected from the obstacle O is converted to be directed to the light receiver 243.

The cleaning robot 200 according to the embodiment is configured such that the reflective surfaces 245-1 to 245-3 of the polygonal rotating mirror 245 are formed to be inclined with respect to the central axis c of the polygonal rotating mirror 245, thereby detecting not only a sensing area existing on the same plane as that having the cleaning robot 200 but also an obstacle O existing at the upper side or lower side of the cleaning robot 200.

In addition, the first to third reflective surfaces 245-1, 245-2 and 245-3 of the polygonal rotating mirror 245 are provided to be rotated clockwise or counterclockwise as the polygonal rotating mirror 245 rotates clockwise or counterclockwise, and thus a wide sensing area may be secured around the cleaning robot 200.

The controller 210 controls the overall operation of the cleaning robot 200 and the flow of signals between the internal components of the cleaning robot 200, and processes data.

The controller 210 may detect an obstacle O on the basis of an electrical signal output from the obstacle sensing part 240 and information stored in the memory 280. In more detail, the controller 210 may detect an obstacle O on the basis of the time at which the light emitter 241 emits light, the time at which the light receiver 243 receives light, rotation information of the polygonal rotating mirror 245, and inclination angles of the first to third reflective surfaces 245-1 to 245-3.

Hereinafter, a method of detecting an obstacle O by the cleaning robot 200 will be described in detail with reference to the accompanying drawings.

Figure 17:
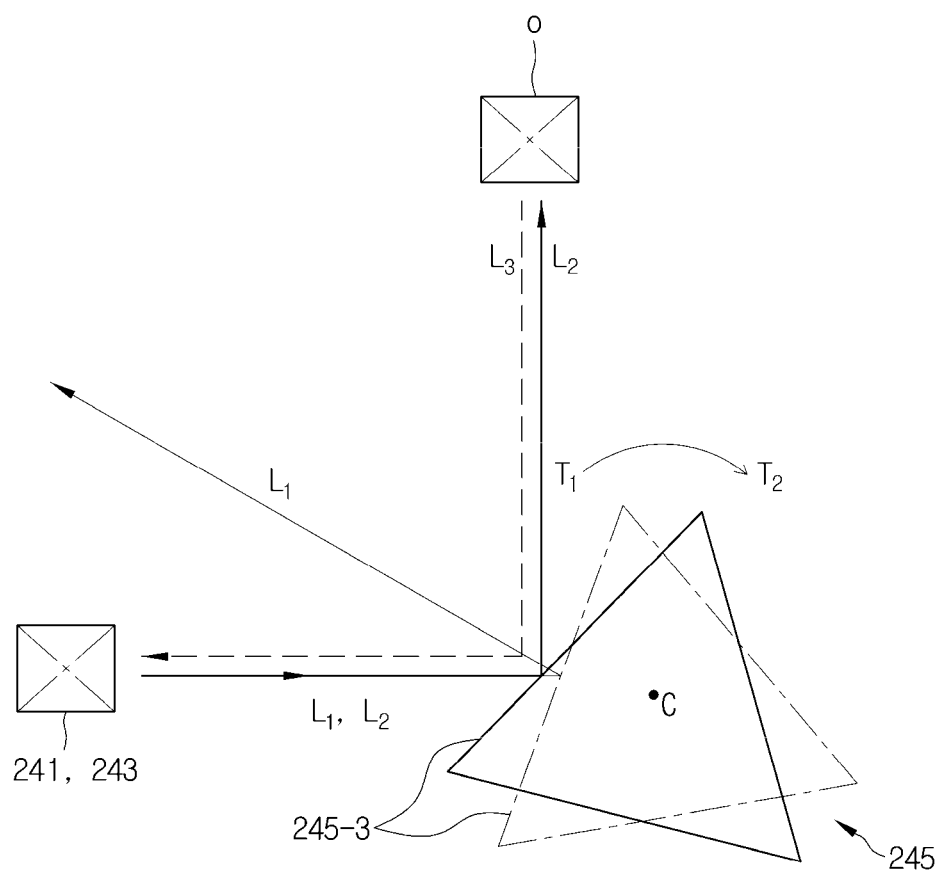
FIG. 17 is a view illustrating an optical path according to rotation of the polygonal rotating mirror on the basis of a cross-section taken along line AA' of the polygonal rotating mirror shown in FIG. 16.

FIG. 17 is a view illustrating an optical path according to rotation of the polygonal rotating mirror 245 on the basis of a cross section taken along line AA' of the polygonal rotating mirror 245 shown in FIG. 16. In FIG. 17, the optical path is illustrated by taking the third reflective surface 245-3 of the polygonal rotating mirror 245 as an example for the sake of convenience in description, and T1 and T2 refer to time points.

First, when the light emitter 241 radiates light in a direction toward the polygonal rotating mirror 245, the optical path of the light is converted by the reflective surface of the polygonal rotating mirror 245, and thus the light serves as a detection light for detection. Light incident onto the polygonal rotating mirror 245 may be reflected according to the law of reflection, and the radiated light having the optical path converted by the polygonal rotating mirror 245 may be referred to as detection light.

Meanwhile, the polygonal rotating mirror 245 rotates about the virtual rotation axis c, and thus the detection light also rotates in the same direction as that of the rotation of the polygonal rotating mirror 245.

Referring to FIG. 17, light L1 radiated from the light emitter 241 at the time T1 during the rotation of the polygonal rotating mirror 245 may be incident onto the third reflective surface 245-3 of the polygonal rotating mirror 245. The light L1 incident onto the third reflective surface 245-3 has the optical path thereof converted by the third reflective surface 245-3 and thus serves as detection light. FIG. 17 shows a case in which an obstacle O is not present on the optical path of the detection light L1, and the detection light L1 advances straight along the traveling direction.

On the other hand, light L2 radiated from the light emitter 241 at the time of T2 during the rotation of the polygonal rotating mirror 245 may be incident on the third reflective surface 245-3 of the polygonal rotating mirror 245. The light L2 incident onto the third reflective surface 245-3 has the optical path thereof converted by the third reflective surface 245-3, and serves as detection light.

FIG. 17 shows a case in which an obstacle O exists on the optical path of the detection light L2, and light L3 reflected from the obstacle O when the obstacle O exists on the optical path of the detection light L2 has the light path thereof converted by the third reflective surface 245-3 of the polygonal rotating mirror 245, and a sensing signal of the obstacle O is generated from the light receiver 243. The sensing signal of the obstacle O generated by the light receiver 243 is transmitted to the controller 210, and is provided for the obstacle detection process of the controller 210.

The controller 210 may detect the obstacle O on the basis of the sensing signal of the obstacle O transmitted from the obstacle sensing part 240.

The controller 210 may detect the distance from the cleaning robot 200 to the obstacle O on the basis of the difference between the time at which light is radiated by the light emitter 241 and the time at which the light is received by the light receiver 243, and speed information of light.

In addition, the controller 210 may detect the direction of the obstacle O on the basis of rotation information of the polygonal rotating mirror 245 and the inclination angle information of the polygonal rotating mirror 245.

In more detail, the controller 210 may determine a reflective surface from which the light having been used to generate the signal in the light receiver 243 is reflected, on the basis of the rotation angle information of the polygonal rotating mirror 245 obtained from the encoder 249, and may detect the direction of the obstacle O on the basis of information of gradients of the reflective surfaces pre-stored in the memory 280 and rotation angle information of the polygonal rotating mirror 245.

In the above, the embodiment of the cleaning robot 200 including the polygonal rotating mirror 245 has been described.

The inventive concept of the present disclosure is not limited to the above description, and the sizes of sensing areas formed by the first to third reflective surfaces 245-1, 245-2, and 245-3 formed on the sides of the polygonal rotating mirror 245 may be adjusted by adjusting the areas of the first to third reflective surface s 245-1, 245-2, and 245-3. In addition, the formation angles of the sensing areas may be adjusted by adjusting the inclinations of the first to third reflective surfaces 245-1, 245-2, and 245-3 with respect to the central axis c of the polygonal rotating mirror 245.

Next, an embodiment of the cleaning robot including a rotating mirror will be described.

Figure 18:
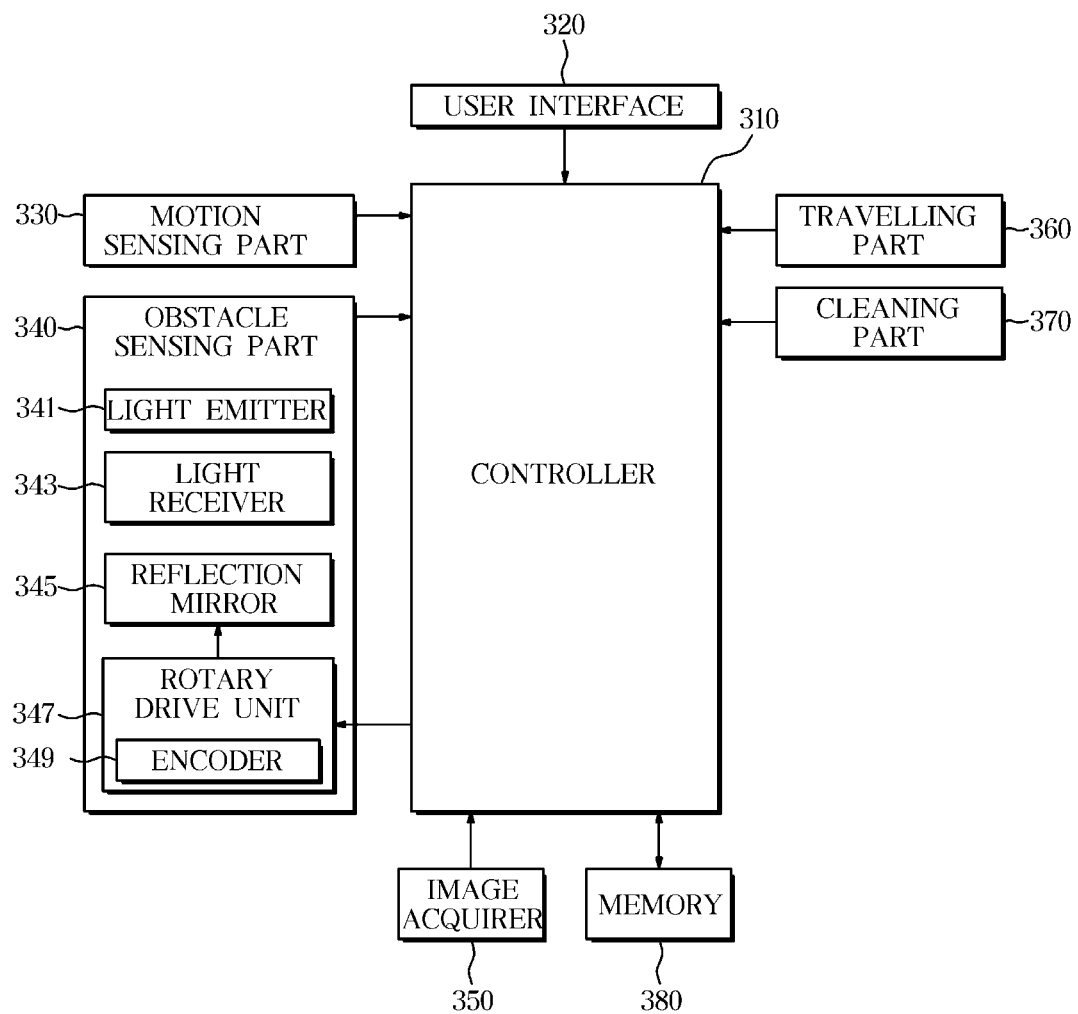
FIG. 18 is a control block diagram illustrating a cleaning robot according to another embodiment.
Figure 19:
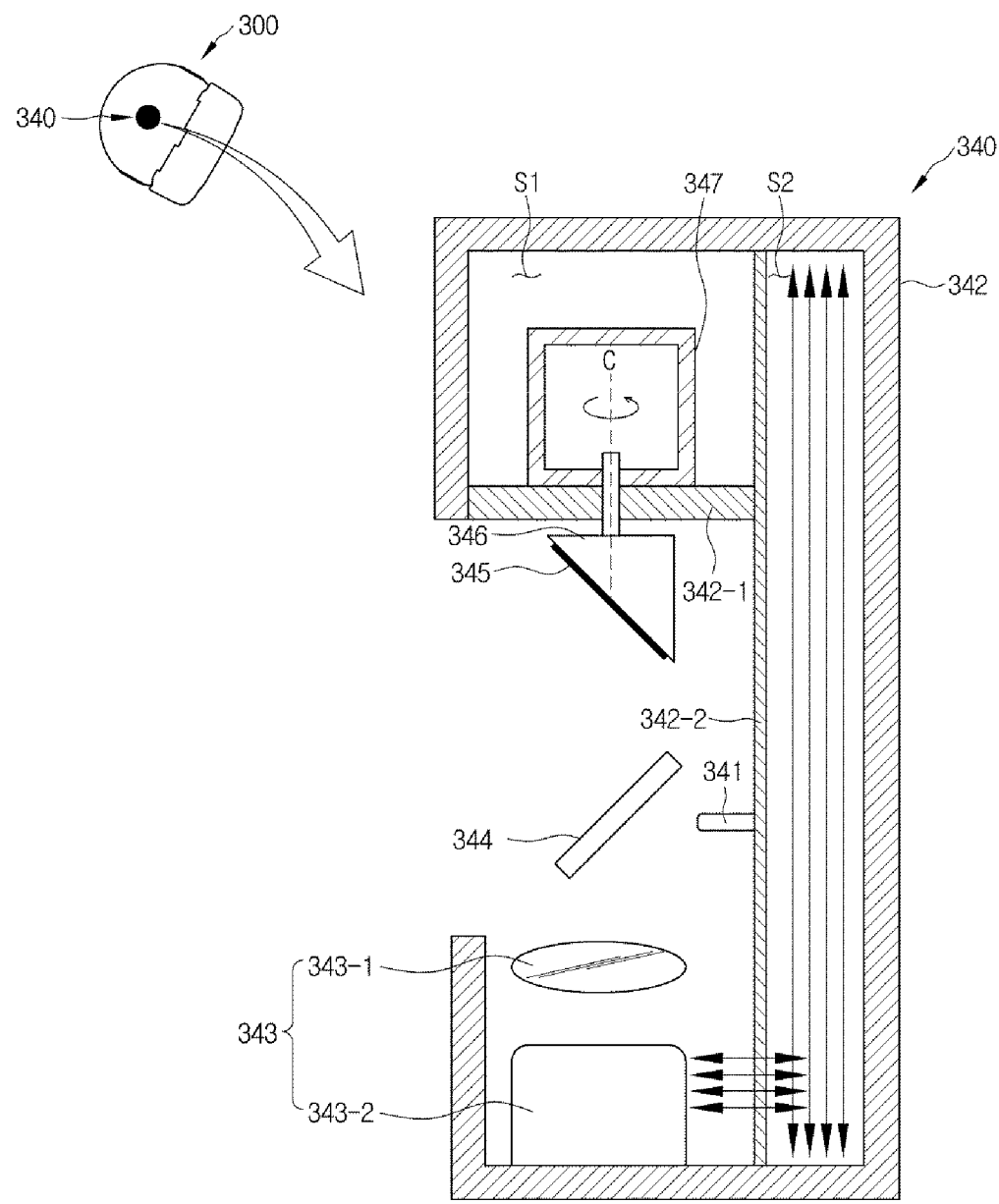
FIG. 19 is a cross-sectional view of an obstacle sensing part of a cleaning robot according to another embodiment.
Figure 20:
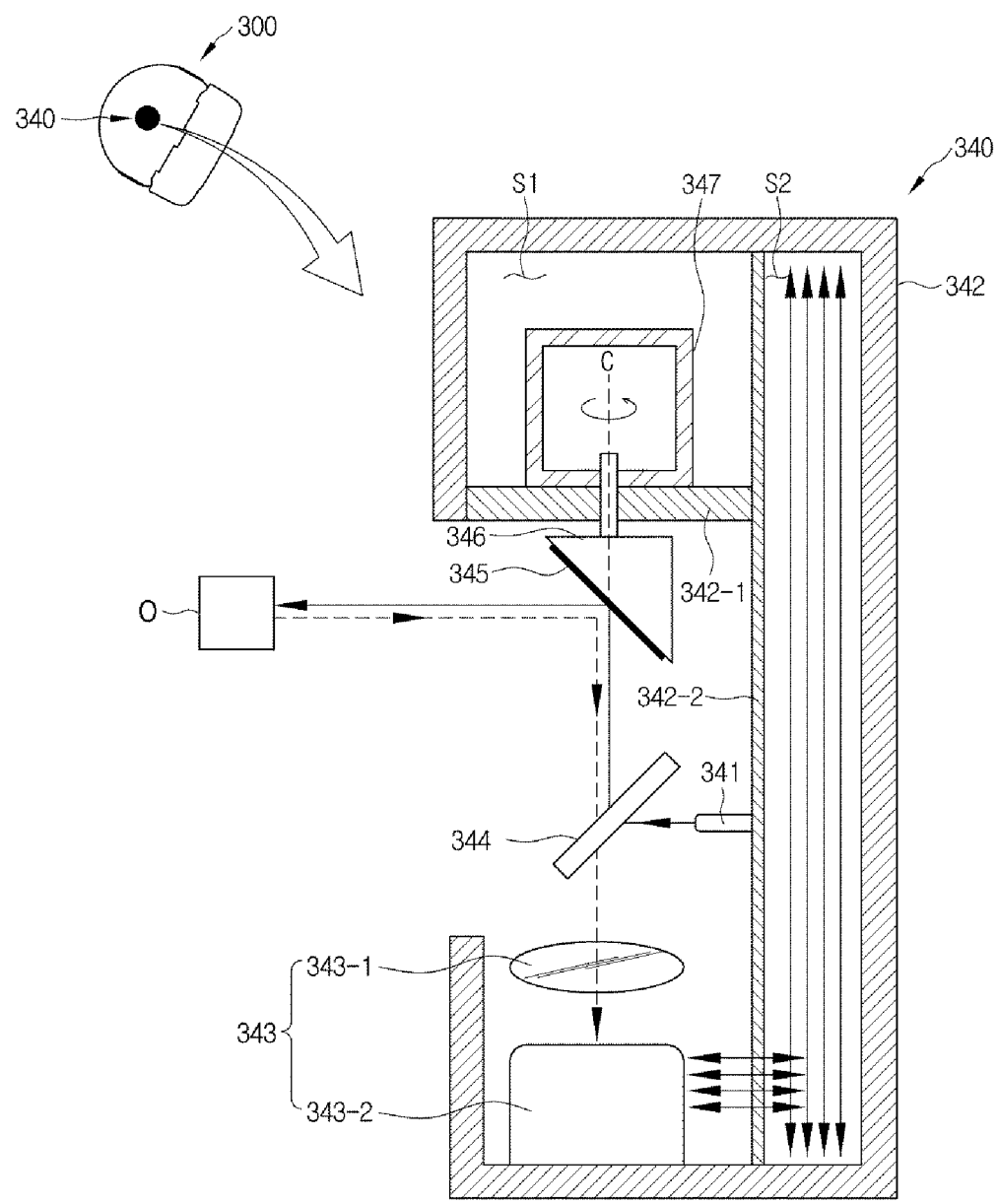
FIG. 20 is a view illustrating a principle of sensing an obstacle by an obstacle sensing part of a cleaning robot according to another embodiment.

FIG. 18 is a block diagram illustrating a control block diagram of a cleaning robot according to another embodiment, FIG. 19 is a cross-sectional view of an obstacle sensing part of a cleaning robot according to another embodiment, and FIG. 20 is a view illustrating a principle of sensing an obstacle by an obstacle sensing part of a cleaning robot according to another embodiment.

Referring to FIG. 18, a cleaning robot 300 according to the present embodiment includes a user interface 320, a motion detector 330, an obstacle sensing part 340, an image acquirer 350, a cleaning part 370, a memory 380, and a controller 310. In the following description of the arrangement of the user interface 320, the motion detector 330, the image acquirer 350, the cleaning part 370, and the memory 380, details of parts identical to those described with reference FIGS. 4 and 5 will be omitted.

Referring to FIG. 19, the obstacle sensing part 340 includes a main body 342 forming the outer appearance of the obstacle sensing part 340, a light emitter 341, a light receiver 343, a splitter 344, a reflection mirror 345, and a rotary drive unit 347 that rotationally drives the reflection mirror 345.

The main body 342 may have a substantially box shape and be provided with an outer circumference thereof open. The main body 342 may be partitioned into a plurality of spaces by a first partition wall 342-1 and a second partition wall 342-2. The first partition wall 342-1 may be disposed to be parallel with the bottom surface of the cleaning robot 300, and the second partition wall 342-2 may be provided to be perpendicular to the first partition wall 342-1.

The main body 342 has a first space S1 defined by the first partition wall 342-1 and a second space S2 defined by the second partition wall 342-2. The rotary drive unit 347 may be accommodated in the first space S1, and a connection line connecting the obstacle sensing part 340 to the cleaning robot 300 may be accommodated in the second partition wall 342-2.

The light emitter 341 may be installed at the lower side of the first partition wall 342-1, and the splitter 344 may be provided around the light emitter 341. The light emitter 341 radiates light to the front, and the radiated light may be transmitted to the cleaning area via the splitter 344 and the reflection mirror 345.

The light receiver 343 may be installed at the lower side of the main body 342. The splitter 344 may be provided around the light receiver 343, in more detail, above the light receiver 343.

The light receiver 343 may include a condensing lens 343-1 for gathering and concentrating received light and an optical sensor 343-2 for detecting the received light, and according to an embodiment, may include an amplifier (not shown) to amplify light detected by the optical sensor 343-2. The optical sensor 343-2 may be a concept including a photodiode and the like, and in the following description of the optical sensor, details of parts identical to those described above will be omitted.

The splitter 344 may be installed adjacent to the light emitter 341 and the light receiver 343, and in more detail, may be installed at a position where the optical path of light radiated by the light emitter 341 meets the optical path of light received by the light receiver 343.

The splitter 344 converts the optical path of light radiated from the light emitter 341 to be directed toward the reflection mirror 345, and converts the optical path of light incident onto the splitter 344 such that light reflected by the reflection mirror 345 advances toward the light receiver 343.

The reflection mirror 345 may be rotatably disposed at the upper side of the main body 342. In more detail, the reflection mirror 345 is installed on one side of a reflection mirror body 346 at an inclination angle of about 45 degrees with respect to the bottom surface of the main body 342. The reflection mirror body 346 may be provided to be rotatable clockwise or counterclockwise by the rotary drive unit 347 accommodated in the first space S1 such that the reflection mirror 345 is rotated clockwise or counterclockwise while being fixed to the reflection mirror body 346.

The controller 310 controls the overall operation of the cleaning robot 300 and the flow of signals between internal components of the cleaning robot 300, and processes data. The controller 310 may execute a program or an application stored in the memory 380 when a command is input from a user or a predetermined condition is satisfied.

The controller 310 may detect an obstacle O on the basis of an electrical signal output from the obstacle sensing part 340 and information stored in the memory 380. In more detail, the controller 310 may detect an obstacle O on the basis of the time at which the light emitter 341 radiates light, the time at which the light receiver 343 receives light, rotation information of the reflection mirror 345, and speed information of light.

Hereinafter, a method of detecting an obstacle O of the cleaning robot 300 will be described in detail with reference to the accompanying drawings.

FIG. 20 is a view illustrating a principle of sensing an obstacle by the obstacle sensing part 340 shown in FIG. 19.

Referring to FIG. 20, when light is radiated from the light emitter 341, the radiated light has the optical path thereof converted by the splitter 344, and then is incident onto the reflection mirror 345. The light incident onto the reflection mirror 345 is radiated to the cleaning area according to the law of reflection, and serves as detection light.

The reflection mirror 345 is rotated by the rotary drive unit 347 to form a wide sensing area around the cleaning robot 300.

When an obstacle O does not exist in the sensing area of the cleaning robot 300, the detection light advances straight along the traveling direction.

When an obstacle O exists in the sensing area of the cleaning robot 300, light reflected from the obstacle O is incident onto the reflection mirror 345. The light incident onto the reflection mirror 345 has the optical path thereof converted by the reflection mirror 345 and then is received by the optical sensor 343-2 via the splitter 344.

The controller 310 may detect the distance from the cleaning robot 300 to the obstacle O on the basis of the difference between the time at which the light emitter 341 emits light and the time at which the light receiver 343 receives light, and the speed information of light. For example, when an obstacle O exists in the sensing area, a difference may occur between the time at which light is emitted by the light emitter 341 and the time at which the light is received by the light receiver 343, and the controller 310 may detect the distance from the cleaning robot 300 to the obstacle O on the basis of information about the time difference between the light radiation and the light reception.

In addition, the controller 310 may also detect the direction of the obstacle O on the basis of the rotation angle information of the reflection mirror 345 obtained from the rotary drive unit 347 of the reflection mirror 345.

In more detail, the controller 310 may detect the direction of the obstacle O on the basis of the rotation angle information of the reflection mirror 345 obtained from the encoder 349 of the rotary drive unit 347, and detect the obstacle O on the basis of the above-described distance information together with the detected direction information.

In the above, various embodiments of the cleaning robots 100, 200, and 300 have been described so far. Hereinafter, a method of controlling the above-described cleaning robot 100, 200, or 300 will be described in detail.

The cleaning robot 100, 200, or 300 according to the disclosure may detect an obstacle around the cleaning robot 100, 200, or 300 on the basis of at least one of a triangulation method and a TOF method.

Hereinafter, a method of controlling a cleaning robot will be described in detail with reference to the accompanying drawings.

Figure 21:
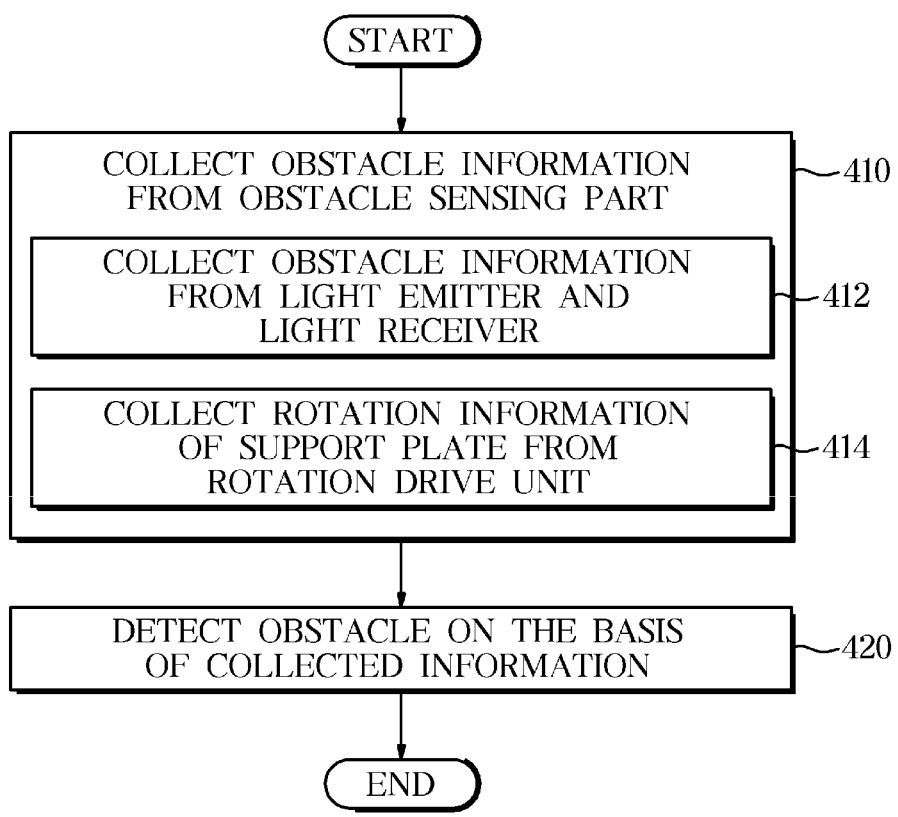
FIG. 21 is a flowchart showing a method of controlling a cleaning robot according to an embodiment.

FIG. 21 is a flowchart showing a method of controlling a cleaning robot according to an embodiment.

In more detail, the method shown in FIG. 21 relates to a method of controlling the cleaning robot illustrated in FIGS. 1 and 13, and for the sake of convenience in description, the following description will be made in relation to the cleaning robot described with reference to FIGS. 8 and 9.

The cleaning robot 100 illustrated in FIGS. 8 and 9 may detect an obstacle O on the basis of at least one of a triangulation method and a TOF method. Hereinafter, the process of detecting an obstacle O by each method will be described in detail.

First, a method of controlling the cleaning robot 100 for detecting an obstacle O by the triangulation method will be described.

Referring to FIG. 21, the method of controlling the cleaning robot 100 according to an embodiment includes collecting information about an obstacle O from the obstacle sensing part 140 (410) and detecting the obstacle O on the basis of the collected information (420).

The collecting of the information about the obstacle O by the obstacle sensing part 140 may include collecting information about an obstacle O from the light emitter 141 and the first to third light receivers 143-1, 143-2, and 143-3 (412), and collecting rotation information of the support plate 145 from the rotation drive unit 147 (414).

The collecting of information about an obstacle O from the light emitter 141 and the first to third light receivers 143-1, 143-2 and 143-3 may include collecting light radiation angle information of the light emitter 14/ and collecting light reception angle information of the first to third light receivers 143-1, 143-2, and 143-3.

Light radiation angles of the light emitter 141 may be stored in advance in the memory 180, and in this case, the collecting of light radiation angle information of the light emitter 141 may represent receiving, by the controller 110, light radiation angle information of the light emitter 141 from the memory 180.

Light reception angles of the first to third light receivers 143-1, 143-2, and 143-3 may be varied according to the position of the obstacle O. In more detail, the form of reflected light may be varied according to the position of the obstacle O, and according to the form of reflected light, the light reception angles of the first to third light receivers 143-1, 143-2, and 143-3 may be varied. The first to third light receivers 143-1, 143-2 and 143-3 may generate different output signals according to the light reception angles, and the controller 110 collects the light reception angle information, and provides the collected light reception angle information for the obstacle detection process (412).

The collecting of rotation information of the support plate 145 from the rotary drive unit 147 may include collecting, by the controller 110, rotation angle information of the support plate 145 from the encoder 149 of the rotary drive unit 147. The rotation angle information of the support plate 145 may be provided for the process of detecting an obstacle O.

Then, the detecting of an obstacle O may be performed on the basis of the collected information (420).

The controller 110 may detect an obstacle O according to the triangulation method. In more detail, the controller 110 controls distance information from the light emitter 141 to the first to third light receivers 143-1, 143-2, and 143-3, light radiation angle information of the light emitter 141, and light reception angle information of the light receiver. In addition, the direction of an obstacle O may be detected on the basis of rotation angle information of the rotary drive unit 147. In the following description, details of parts identical to those described above will be omitted.

Next, a method of controlling the cleaning robot 100 when the cleaning robot 100 detects an obstacle O by the TOF method will be described.

Referring to FIG. 21, a method of controlling the cleaning robot 100 according to an embodiment includes collecting, by the obstacle sensing part 140, information about an obstacle O (410) and detecting an obstacle O on the basis of the collected information (420). The method of detecting an obstacle O according to the TOF method is different from the method using the triangulation method in terms of the type of collected information and a method of processing collected information.

In detail, the collecting of information about an obstacle (O) by the obstacle sensing part 140 may include acquiring information about an obstacle O from the light emitter 141 and the first to third light receivers 143-1, 143-2, and 143-3 (412), and collecting rotational information of the support plate 145 from the rotary drive unit 147 (414).

In detail, the collecting of information about an obstacle O from the light emitter 141 and the first to third light receivers 143-1, 143-2, and 143-3 may include collecting light radiation time information of the light emitter 141 and light reception time information of the first to third light receivers 143-1, 143-2, and 143-3.

When an obstacle O exists in the sensing area of the obstacle sensing part 140, the time taken for light radiated from the light emitter 141 to return to the light receiver 143 is shorter than that when an obstacle O does not exist. Accordingly, the controller 110 may collect the light radiation time point information of the light emitter 141 and the light reception time point information of the light receiver 143 and provide the collected information for the obstacle detection process.

According to an embodiment using a TOF method based on phase difference of light, the controller 110 may collect phase information of light radiated from the light emitter 141 and phase information of light received by the light receiver 143 (412).

The collecting of rotation information of the support plate 145 from the rotary drive unit 147 is identical to the above description using the triangulation method, and details of parts identical to the above description will be omitted.

Then, the detecting of an obstacle O is performed on the basis of the collected information (420).

The controller 110 may detect an obstacle O according to the TOF method. In more detail, the controller 110 may detect the distance from the cleaning robot 100 to the obstacle O on the basis of the difference between the light radiation time point of the light emitter 141 and the light reception time point of the first to third light receivers 143-1, 143-2, and 143-3, and speed information of light received from the memory 180. In addition, the direction of the obstacle O may be detected on the basis of rotation angle information of the rotary drive unit 147. Hereinafter, details of parts identical to the above description will be omitted.

Figure 22:
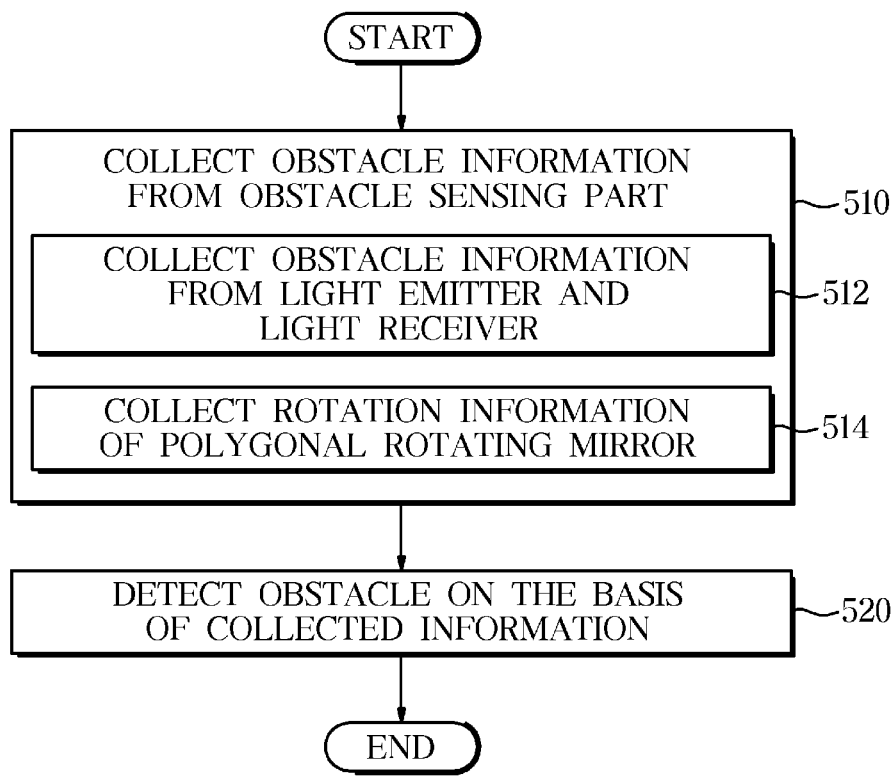
FIG. 22 is a flowchart showing a method of controlling a cleaning robot according to an embodiment.

FIG. 22 is a flowchart showing a method of controlling a cleaning robot according to an embodiment. The method of controlling a cleaning robot according to FIG. 22 relates to a method of the cleaning robot illustrated in FIG. 14 to FIG. 17, and the following description will be made with reference to FIGS. 14 and 17.

Referring to FIG. 22, the method of controlling the cleaning robot 200 according to the present embodiment includes collecting information about an obstacle O from the obstacle sensing part 240 (510) and detecting an obstacle O on the basis of the collected information (520). The collecting of information about an obstacle O includes collecting information about an obstacle from the light emitter 241 and the light receiver 243 (512) and collecting rotation information of the polygonal rotating mirror 245 from the rotary drive unit 247 (514).

The collecting of information about an obstacle O from the light emitter 241 and the light receiver 243 may include collecting light radiation time point information of the light emitter 241 and light reception time information of the light receiver 243.

When an obstacle O exists in the sensing area of the obstacle sensing part 240, the time taken for light radiated from the light emitter 241 to return to the light receiver 243 is shorter than that when an obstacle O does not exist. Accordingly, the controller 210 may detect the distance from the cleaning robot 200 to the obstacle O on the basis of the light radiation time point information of the light emitter 241 and the light reception time point information of the light receiver 243 (512).

The collecting of rotation information of the polygonal rotating mirror 245 from the rotary drive unit 247 may including collecting, by the controller 210, rotation angle information of the polygonal rotating mirror 245 from the encoder 249 of the polygonal rotating mirror 245.

The controller 210 determines a reflective surface from which the light received by the light receiver 243 is reflected, among the reflective surfaces 245-1, 245-2, and 245-3 of the polygonal rotating mirror 245 on the basis of the collected rotation angle information of the polygonal rotating mirror 245. In the following description, details of parts identical to the above description will be omitted.

Then, the detecting of an obstacle O will be performed on the basis of the collected information (520).

The controller 210 may detect an obstacle O on the basis of the TOF method. In more detail, the controller 210 may detect the distance from the cleaning robot 200 to an obstacle O on the basis of the difference between the light radiation time point of the light emitter 241 and the light reception time point of the light receiver 243 and speed information of light received from the memory 280. In addition, the controller 210 may detect the direction of the obstacle O with reference to the xy plane on the basis of rotation angle information of the polygonal rotating mirror 245, and detect the direction of the obstacle O with reference to the z axis on the basis of rotation angel information of the polygonal rotating mirror 245 and inclination information of the polygonal rotating mirror 245 received from the memory 280. In the following description, details of parts identical to the above description will be omitted.

Figure 23:
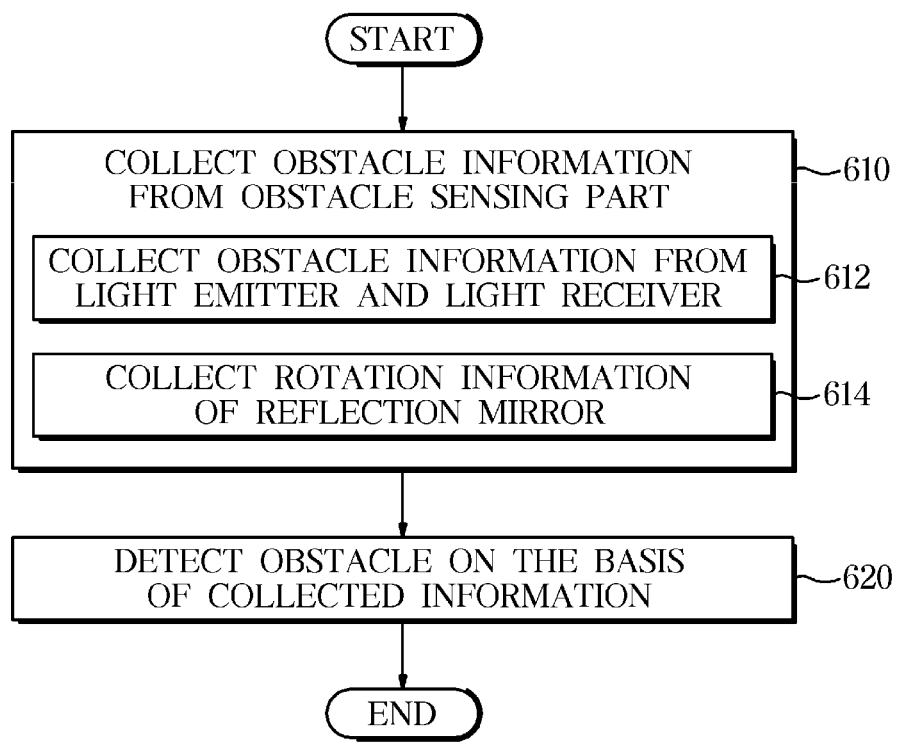
FIG. 23 is a flowchart showing a method of controlling a cleaning robot according to an embodiment.

FIG. 23 is a flowchart showing a method of controlling a cleaning robot according to an embodiment. The method of controlling a cleaning robot according to FIG. 23 relates to a method of controlling the cleaning robot according to FIGS. 18 to 20. Hereinafter, the method of cleaning robot according to the present embodiment will be described with reference to FIGS. 18 to 20.

Referring to FIG. 23, the method of controlling the cleaning robot 300 according to the embodiment includes collecting information about an obstacle O from the obstacle sensing part 340 (610), and detecting an obstacle O on the basis of the collected information (620). The collecting of information about an obstacle O from the obstacle sensing part 340 may include collecting information about an obstacle O from the light emitter 341 and the light receiver 343 (612), and collecting rotation information of the reflection mirror 345 from the rotary drive unit 347 (614).

The collecting of information about an obstacle O from the light emitter 341 and the light receiver 343 may include collecting light radiation time point information of the light emitter 341 and light reception time point information of the light receiver 343.

When an obstacle O exists in the sensing area of the obstacle sensing part 340, the time for light radiated from the light emitter 341 to returns to the light receiver 343 is shorter than that when an obstacle O does not exist. Accordingly, the controller 310 may detect the distance from the cleaning robot 300 to the obstacle O on the basis of the light radiation time point information of the light emitter 341 and the light reception time point information of the light receiver 343 (612).

The collecting of rotation information of the reflection mirror 345 from the rotary drive unit 347 includes collecting, by the controller 310, rotation angle information of the reflection mirror 345 from the encoder 349 of the rotary drive unit 347 (614).

Then, the detecting of an obstacle O is performed on the basis of the collected information (620).

The controller 310 may detect an obstacle O on the basis of the TOF method. In more detail, the controller 310 may detect the distance from the cleaning robot 300 to an obstacle O on the basis of the difference between the light radiation time point of the light emitter 341 and the light reception time point of the light receiver 343 and speed information of light received from the memory 380. In addition, the controller 310 may detect the direction of the obstacle O with reference to the xy plane on the basis of rotation angle information of the reflection mirror 345. In the following description, details of parts identical to the above description will be omitted.

Although the cleaning robot and the method of controlling the same have been described with reference to the embodiments of the present disclosure, the present disclosure is not limited to the above described embodiments, and those skilled in the art will appreciate that various modifications, additions and substitutions are possible, without departing from the scope and spirit of the disclosure.

The invention claimed is:

1. A cleaning robot comprising:
 a light emitter configured to radiate light;
 a plurality of light receivers configured to receive a radiation of the light in a predetermined direction among radiations of the light reflected from an obstacle when the radiated light is reflected from the obstacle;
 a support plate to which the light emitter and the plurality of light receivers are fixed, the support plate being rotatable; and
 at least one processor configured to detect the obstacle based on:
  output signals transmitted from the light emitter and the plurality of light receivers, and
  rotation information of the support plate.

2. The cleaning robot of claim 1, wherein each of the plurality of light receivers is disposed at a different gradient to receive light in a different direction.

3. The cleaning robot of claim 1, wherein the light emitter and the plurality of light receivers are disposed to be parallel with each other on the support plate, or stacked to be perpendicular with each other on the support plate.

4. The cleaning robot of claim 3,
 wherein the plurality of light receivers includes:
  a first light receiver configured to receive a radiation of light in a predetermined first direction, and
  a second light receiver configured to receive a radiation of light in a predetermined second direction, and
 wherein the light emitter includes:
  a first light emitter configured to radiate light in the predetermined first direction, and a second light emitter configured to radiate light in the predetermined second direction.

5. The cleaning robot of claim 4,
wherein the first light receiver and the first light emitter are disposed adjacent to each other in a direction parallel to the support plate, and
wherein the second light receiver and the second light emitter are disposed adjacent to each other in a direction parallel to the support plate.

6. The cleaning robot of claim 4,
wherein the first light receiver and the first light emitter are stacked one on top of another in a direction perpendicular to the support plate, and
wherein the second light receiver and the second light emitter are stacked one on top of another in a direction perpendicular to the support plate.

7. The cleaning robot of claim 1,
wherein the light emitter radiates line light in a lengthwise direction of the cleaning robot, and
wherein the light emitter includes:
a light source, and
a conversion lens configured to convert light generated from the light source into the line light.

8. The cleaning robot of claim 7, wherein the light emitter and the plurality of light receivers are stacked one on top of another in a direction to the support plate.

9. The cleaning robot of claim 8, wherein the light emitter and the plurality of light receivers are disposed such that a light emitting position of the light emitter and a light reception position of the plurality of light receivers are spaced apart from each other by a predetermined first distance in a direction parallel to a support surface of the support plate.

10. The cleaning robot of claim 1, further comprising:
a rotary driver for rotationally driving the support plate, the rotary driver including an encoder,
wherein the rotation information includes rotation angle information of the support plate, and
wherein the at least one processor is further configured to detect the obstacle based on the rotation angle information of the support plate.

11. The cleaning robot of claim 1, wherein the at least one processor is further configured to detect the obstacle based on at least one of a triangulation method or a Time of flight (TOF) method.

12. A method of controlling a cleaning robot including a light emitter configured to radiate light a plurality of light receivers configured to receive a radiation of the light in a predetermined direction among radiations of the light reflected from an obstacle when the radiated light is reflected from the obstacle and a support plate to which the light emitter and the plurality of light receivers are fixed, the support plate being rotatable, the method comprising:
collecting obstacle information from the light emitter and the plurality of light receivers;
collecting rotation information of the support plate from a rotary driver, the rotary driver rotationally driving the support plate; and
detecting the obstacle based on output signals transmitted from the light emitter and the plurality of light receivers, and the rotation information of the support plate.

13. The method of claim 12, wherein the detecting of the obstacle includes detecting the obstacle based on at least one of a triangulation method or a Time of flight (TOF) method.

14. The method of claim 12,
wherein the light emitter and the plurality of light receivers are disposed such that a light radiating position of the light emitter and a light reception position of the plurality of the light receivers are spaced apart from each other by a predetermined first distance in a direction parallel to a support surface of the support plate, and
wherein the detecting of the obstacle includes detecting the obstacle based on the predetermined first distance, light radiating angle information of the light emitter, light reception angle information of at least one of the plurality of the light receivers, and rotation information of the support plate.

15. The method of claim 12, wherein the detecting of the obstacle includes detecting the obstacle based on a light radiating time point of the light emitter, a light reception time point of at least one of the plurality of light receivers, and rotation information of the support plate.

* * * * *